US012431527B2

(12) United States Patent
Wu et al.

(10) Patent No.: US 12,431,527 B2
(45) Date of Patent: Sep. 30, 2025

(54) CLAMPING APPARATUS, BATTERY PRODUCTION LINE AND TRANSFER METHOD

(71) Applicant: CONTEMPORARY AMPEREX TECHNOLOGY (HONG KONG) LIMITED, Hong Kong (CN)

(72) Inventors: Kai Wu, Ningde (CN); Yule Yang, Ningde (CN); Youshan Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/210,622

(22) Filed: May 16, 2025

(65) Prior Publication Data
US 2025/0279459 A1 Sep. 4, 2025

Related U.S. Application Data

(63) Continuation of application No. PCT/CN2023/139984, filed on Dec. 19, 2023.

(30) Foreign Application Priority Data

Oct. 13, 2023 (CN) .......................... 202311322989.3

(51) Int. Cl.
H01M 10/04 (2006.01)
B25J 15/00 (2006.01)
(52) U.S. Cl.
CPC ..... *H01M 10/0404* (2013.01); *B25J 15/0028* (2013.01)
(58) Field of Classification Search
CPC .............. H01M 10/0404; B25J 15/0028; B25J 15/0253; B65G 47/90
See application file for complete search history.

(56) References Cited

U.S. PATENT DOCUMENTS 10,440,870 B1 * 10/2019 Solanki ............. H05K 13/0408
2021/0331327 A1 * 10/2021 Lee ....................... B25J 15/0253
2022/0255111 A1 * 8/2022 Jung ................. H01M 10/0404

FOREIGN PATENT DOCUMENTS

AT          A268681 A      1/1983
CN         204144391 U     2/2015
(Continued)

OTHER PUBLICATIONS

International Search Report in the international application No. PCT/CN2023/139984, mailed on Jul. 11, 2024. 6 pages with English translation.

(Continued)

*Primary Examiner* — Helen Oi K Conley
*Assistant Examiner* — Amanda Rosenbaum
(74) *Attorney, Agent, or Firm* — ANOVA LAW GROUP, PLLC

(57) ABSTRACT

A clamping apparatus, includes: a support assembly including a first driving module and clamping mechanisms disposed on the support assembly and including at least one first clamping mechanism and at least one second clamping mechanism arranged along a first direction. When the clamping apparatus is in a first state, an opening direction of a clamping opening of the first clamping mechanism faces away from the second clamping mechanism. When the clamping apparatus is in a second state, the opening direction of the clamping opening of the first clamping mechanism faces towards the second clamping mechanism. The opening direction of the clamping opening of the first clamping mechanism is consistent with an opening direction of a clamping opening of the second clamping mechanism. The first driving module drives the first clamping mechanism to rotate, such that the clamping apparatus switches between the first state and the second state.

17 Claims, 19 Drawing Sheets

(56) References Cited

FOREIGN PATENT DOCUMENTS

| | | |
|---|---|---|
| CN | 105775731 A | 7/2016 |
| CN | 106629031 A | 5/2017 |
| CN | 210336006 U | 4/2020 |
| CN | 112456122 A | 3/2021 |
| CN | 112499272 A | 3/2021 |
| CN | 214454862 U | 10/2021 |
| CN | 215070102 U | 12/2021 |
| CN | 216302578 U | 4/2022 |
| CN | 217102027 U | 8/2022 |
| CN | 217605935 U | 10/2022 |
| CN | 117049161 A | 11/2023 |
| KR | 20230003995 A | 1/2023 |
| NL | 2003262 C2 | 1/2011 |

OTHER PUBLICATIONS

Written Opinion of the International Search Authority in the international application No. PCT/CN2023/139984, mailed on Jul. 11, 2024. 8 pages with English translation.

Notice of Allowance of the Chinese application No. 202311322989.3, issued on Nov. 21, 2023. 9 pages with English translation.

\* cited by examiner

CLAMPING APPARATUS, BATTERY PRODUCTION LINE AND TRANSFER METHOD

CROSS-REFERENCE TO RELATED APPLICATIONS

This application is a continuation of International Application No. PCT/CN2023/139984, filed on Dec. 19, 2023, which is based on and claims priority to the Chinese Patent Application No. 202311322989.3, filed on Oct. 13, 2023, and entitled "CLAMPING APPARATUS, BATTERY PRODUCTION LINE AND TRANSFER METHOD", which are incorporated herein by reference in their entirety.

TECHNICAL FIELD

This disclosure relates to the technical field of battery production, and in particular, to a clamping apparatus, a battery production line and a transfer method.

BACKGROUND

New energy batteries are widely used in life and industry. For example, new energy vehicles equipped with batteries have been widely used. In addition, batteries are increasingly used in fields such as energy storage.

Battery cells are clamped by a clamping apparatus on a battery production line so as to be transferred. In the related art, it is difficult for the clamping apparatus to meet the transfer requirements of a plurality of groups of battery cells.

SUMMARY

To solve the above technical problems, this disclosure provides a clamping apparatus, a battery production line and a transfer method so as to meet the transfer requirements of a plurality of groups of battery cells.

This disclosure is achieved by the following technical solution:

A first aspect of embodiments of this disclosure provides a clamping apparatus, and the clamping apparatus has a first state and a second state. The clamping apparatus includes:
- a support assembly, including a support module and a first driving module disposed on the support module; and
- clamping mechanisms, disposed on the support assembly, where a quantity of the clamping mechanisms is at least two, at least one of the clamping mechanisms is a first clamping mechanism, and at least one of the clamping mechanisms is a second clamping mechanism; the first clamping mechanism and the second clamping mechanism are arranged along a first direction; when the clamping apparatus is in the first state, an opening direction of a clamping opening of the first clamping mechanism faces away from the second clamping mechanism along the first direction; when the clamping apparatus is in the second state, the opening direction of the clamping opening of the first clamping mechanism faces towards the second clamping mechanism along the first direction, such that the opening direction of the clamping opening of the first clamping mechanism is consistent with an opening direction of a clamping opening of the second clamping mechanism; where
- the first driving module is configured to drive the first clamping mechanism to rotate, enabling the clamping apparatus to switch between the first state and the second state, and each clamping opening is configured to allow a battery cell to move in or out of the corresponding clamping mechanism along the first direction.

In the embodiments of this disclosure, with the clamping apparatus switched to the first state, the clamping opening of the first clamping mechanism will not be shielded by the second clamping mechanism, such that a plurality of groups of battery cells clamped by the clamping apparatus can be released smoothly, thereby completing the transfer of the plurality of groups of battery cells.

In an embodiment, the first driving module includes:
- a driver, disposed on the support module; and
- a mounting seat, at least partially disposed on the driver, where the driver drives the mounting seat to rotate, and the first clamping mechanism is disposed on the mounting seat.

In the embodiments of this disclosure, the mounting seat is adapted to a shape of a mounting position of the clamping mechanism, the first clamping mechanism is disposed on the mounting seat, the first clamping mechanism and the support module can be isolated as much as possible using the mounting seat, and the possibility that the first clamping mechanism interferes with the support module in a transfer process is reduced.

In an embodiment, each clamping mechanism is provided with a mounting portion, the mounting seat is connected to the mounting portion of the corresponding clamping mechanism, the driver, the mounting seat and the mounting portion of the corresponding clamping mechanism are sequentially arranged along a second direction, and the second direction intersects the first direction.

In the embodiments of this disclosure, the driver occupies a space between the first clamping mechanism and the support module, the driver and the mounting seat jointly play the role of separating the first clamping mechanism from the support module, and a size of the mounting seat along the second direction can be appropriately reduced.

In an embodiment, the second clamping mechanism is partially connected to the support module, and the opening direction of the clamping opening of the second clamping mechanism faces away from the first clamping mechanism.

In the embodiments of this disclosure, the second clamping mechanism is partially connected to the support module, such that the opening direction of the clamping opening of the second clamping mechanism is basically unchanged, thereby simplifying a structure of the clamping apparatus.

In an embodiment, the support module includes:
- a rack body, where the first driving module is disposed on the rack body; and
- a mounting arm, connected to the rack body, where the second clamping mechanism is partially connected to the mounting arm.

In the embodiments of this disclosure, the mounting arm is adapted to the shape of the mounting position of the clamping mechanism, and the second clamping mechanism can be separated from the rack body by a certain distance using the mounting arm, such that a distance between the clamping opening of the second clamping mechanism and the rack body and a distance between the clamping opening of the first clamping mechanism and the rack body can be as close as possible.

In an embodiment, the clamping mechanism includes:
- a regulation assembly, disposed on the support assembly; and
- clamping assemblies, disposed on the regulation assembly, where a quantity of the clamping assemblies is two, each of the clamping assemblies is provided with the clamping opening, the opening directions of the corresponding clamping openings of the two clamping assemblies are consistent, an arrangement direction of the two clamping assemblies is a third direction, the third direction intersects the opening directions of the corresponding clamping openings, and the regulation assembly drives the two clamping assemblies to move towards or away from each other along the third direction.

In the embodiments of this disclosure, the two clamping assemblies are adjusted to move towards or away from each other using the regulation assembly, so as to adapt to grouped battery cells with different sizes and specifications.

In an embodiment, the regulation assembly includes:
a main seat, disposed on the support assembly;
a second driving module, installed on the main seat;
a screw rod, rotatably connected to the main seat, where the screw rod is located at one side of the main seat facing away from the support assembly, the screw rod is provided with a first thread and a second thread, the first thread and the second thread are arranged along an axial direction of the screw rod, the axial direction of the screw rod is arranged along the third direction, and a rotation direction of the first thread is opposite to a rotation direction of the second thread; and
regulation seats, where the clamping assemblies are disposed on the regulation seats, with a regulation seat corresponding to each clamping assembly, one of the regulation seats is in threaded connection to the first thread, the other regulation seat is in threaded connection to the second thread, and the second driving module drives the screw rod to rotate, causing the two regulation seats to move the clamping assemblies towards or away from each other.

In the embodiments of this disclosure, the screw rod is driven to rotate using the second driving module, causing the two regulation seats to move the clamping assemblies towards or away from each other, thereby achieving the purpose of adapting to grouped battery cells with different sizes and specifications.

In an embodiment, each clamping assembly includes:
a telescopic piece, disposed on the regulation assembly; and
a clamping jaw, disposed on the regulation assembly, where the clamping jaw is provided with a clamping portion, the clamping portion is located at one side of the regulation assembly facing away from the support assembly, the telescopic piece is located at one side of the clamping portion facing towards the corresponding regulation assembly, and the clamping portion and the telescopic piece together form a perimeter that defines the clamping opening.

In the embodiments of this disclosure, the telescopic piece is located at the side of the clamping portion facing towards the corresponding regulation assembly, and the telescopic piece is close to the regulation assembly, such that the possibility that the telescopic piece hangs out of the regulation assembly is reduced.

A second aspect of the embodiments of this disclosure provides a battery production line, including:
a transfer apparatus;
any one of the above clamping apparatuses, where the clamping apparatus has a third state, the support module is disposed on the transfer apparatus, and the transfer apparatus can drive the support module to rotate about a first rotation center line, so as to swap positions of the first clamping mechanism and the second clamping mechanism;
a grouping table, configured to place grouped battery cells, where the transfer apparatus drives the clamping apparatus to grab the grouped battery cells from the grouping table; and
a conveying apparatus, configured to receive and convey the battery cells clamped by the clamping apparatus, where when the clamping apparatus is at a position to release the battery cells onto the corresponding conveying apparatus, an arrangement direction of the clamping apparatus and the corresponding conveying apparatus is an up-and-down direction, and when the clamping apparatus is in the third state, the first rotation center line intersects the up-and-down direction.

In the embodiments of this disclosure, a plurality of groups of grouped battery cells are grabbed using the clamping apparatus at one time in the same orientation on the grouping table, and the clamping apparatus switches between the first state and the second state, such that the plurality of groups of battery cells grabbed using the clamping apparatus at one time in the same orientation can be smoothly released to the conveying apparatus.

In an embodiment, the clamping apparatus further has a fourth state, and when the clamping apparatus is in the fourth state, the first rotation center line extends in the up-and-down direction; and the transfer apparatus can drive the support module to rotate about a second rotation center line, such that the clamping apparatus can switch between the third state and the fourth state, and the second rotation center line intersects the first rotation center line.

In the embodiments of this disclosure, switching between the third state and the fourth state enables tape sticking surfaces of the battery cells to be disposed upwards, which is conducive to subsequent tape sticking.

In an embodiment, the support module is provided with a connecting portion connected to the corresponding transfer apparatus, the connecting portion is located at one side of the corresponding support module facing away from the corresponding clamping mechanism along a preset direction, and the preset direction is a direction along the first rotation center line;
the conveying apparatus is provided in a quantity of two, an arrangement direction of the two conveying apparatuses is a fourth direction, the transfer apparatus is disposed at one side of each of the conveying apparatuses facing away from the other corresponding conveying apparatus along the fourth direction, the transfer apparatus at each side is correspondingly provided with the clamping apparatus, and conveying directions of the two conveying apparatuses are consistent; and
in the two conveying apparatuses, one conveying apparatuses is a first conveying apparatus, the other conveying apparatus is a second conveying apparatus, the transfer apparatus at one side of the first conveying apparatus facing away from the second conveying apparatus along the fourth direction is a first transfer apparatus, the first transfer apparatus drives the corresponding clamping apparatus to move so as to release the corresponding battery cells onto the second conveying apparatus, the transfer apparatus at one side of the second conveying apparatus facing away from the first conveying apparatus along the fourth direction is a second transfer apparatus, and the second transfer apparatus drives the corresponding clamping apparatus to move so as to release the corresponding battery cells onto the first conveying apparatus.

In the embodiments of this disclosure, due to the need of pole orientation, the battery cells clamped by each clamping apparatus are released to the farther conveying apparatus, such that one side of the support module facing towards the corresponding transfer apparatus along the fourth direction has enough telescopic space for the transfer apparatus to stretch out and draw back to move, and thus, the clamping apparatuses corresponding to the transfer apparatuses at both sides can avoid each other, and the possibility of interference between the clamping apparatuses corresponding to the transfer apparatuses at both sides is reduced. When the clamping apparatus is in the third state, the clamping mechanism corresponding to the transfer apparatus at each side is located between the corresponding connecting portion and the corresponding transfer apparatus at the other side along the fourth direction, and a size of the transfer apparatus at each side along the fourth direction can be set to be smaller, which can meet the requirement that the corresponding clamping apparatus moves to the farther conveying apparatus to release the battery cells, which is conducive to reducing the space occupation of the transfer apparatus.

In an embodiment, the battery production line is provided with safety regions, the clamping apparatus driven by the transfer apparatus at each side is provided with a corresponding safety region, the safety regions corresponding to the clamping apparatuses driven by the transfer apparatuses at both sides are spaced apart along the fourth direction, the transfer apparatus at each side is located at one side of the corresponding safety region facing away from the safety region corresponding to the transfer apparatus at the other side along the fourth direction, and the transfer apparatus at each side can drive the corresponding clamping apparatus to move into the corresponding safety region.

In the embodiments of this disclosure, the two clamping apparatuses move in the two safety regions separated apart, such that the possibility of interference of the clamping apparatuses is reduced.

A third aspect of the embodiments of this disclosure provides a transfer method. A clamping apparatus has a first state and a second state, when the clamping apparatus is in the first state, an opening direction of a clamping opening of a first clamping mechanism faces away from a second clamping mechanism along a first direction, and when the clamping apparatus is in the second state, the opening direction of the clamping opening of the first clamping mechanism faces towards the second clamping mechanism along the first direction, such that the opening direction of the clamping opening of the first clamping mechanism is consistent with an opening direction of a clamping opening of the second clamping mechanism. The transfer method includes:

clamping a plurality of groups of battery cells in the same orientation from a grouping table using the clamping apparatus in the second state;

driving a support module to move using a transfer apparatus, such that the second clamping mechanism with the battery cells clamped moves to a material release position of a corresponding conveying apparatus to release the battery cells;

driving the support module to move using the transfer apparatus, such that the first clamping mechanism with the battery cells clamped moves to a corresponding pre-placement position, where a state of the clamping apparatus corresponding to the first clamping mechanism at the corresponding pre-placement position is a third state;

driving the first clamping mechanism to rotate using a first driving module, such that the clamping apparatus with the battery cells clamped switches from the second state to the first state; and when the clamping apparatus with the battery cells clamped is in the first state and the first clamping mechanism is located at the corresponding pre-placement position, driving the support module to move using the transfer apparatus, such that the first clamping mechanism moves from the corresponding pre-placement position to the material release position of the corresponding conveying apparatus to release the battery cells.

In the embodiments of this disclosure, the support module is driven to move using the transfer apparatus, that is, the corresponding second clamping mechanism can move to the corresponding material release position to release the battery cells, and the first driving module drives the first clamping mechanism to rotate, such that the clamping apparatus switches to the first state, the clamping opening of the first clamping mechanism corresponding to the clamping apparatus in the first state is not shielded by the second clamping mechanism, and the first clamping mechanism can conveniently and smoothly release the battery cells onto the conveying apparatus. Therefore, the first clamping mechanism is driven to rotate using the first driving module, such that the clamping apparatus switches to the first state, and the clamping apparatus can smoothly release the plurality of groups of grouped battery cells grabbed on the grouping table onto the conveying apparatus.

In an embodiment, the transfer method further includes:

driving the corresponding clamping apparatus to move using the transfer apparatus at each side, such that the clamping apparatus corresponding to the clamping mechanism at the material release position moves to a first safety position of a corresponding safety region;

driving the corresponding clamping apparatus to move from the first safety position to a second safety position in the corresponding safety region using the transfer apparatus at each side, such that target directions of the clamping apparatuses face opposite ways, where the target direction is a direction in which the clamping apparatus corresponding to the transfer apparatus at each side points to the clamping apparatus corresponding to the transfer apparatus at the other side along a straight line where a conveying direction of the conveying apparatus is located; and driving the corresponding clamping apparatus at the second safety position to move using the transfer apparatus at each side, such that the other clamping mechanism of the corresponding clamping apparatus moves from the corresponding safety region to the corresponding material release position.

In the embodiments of this disclosure, the two clamping apparatuses draw back into the safety region to move, such that the possibility of interference between the two clamping apparatuses in a moving process is reduced.

In an embodiment, the driving a support module to move using a transfer apparatus, such that the second clamping mechanism with the battery cells clamped moves to a material release position of a corresponding conveying apparatus to release the battery cells includes:

driving the support module to move using the transfer apparatus, such that the second clamping mechanism moves to a corresponding pre-placement position, where a state of the clamping apparatus corresponding to the second clamping mechanism at the corresponding pre-placement position is a third state; and driving the support module to move using the transfer apparatus, such that the second clamping mechanism moves from the pre-placement position to the material release position of the corresponding conveying apparatus to release the battery cells.

In the embodiments of this disclosure, the second clamping mechanism can complete various preparation actions in a process of moving to the pre-placement position, and then moves from the pre-placement position to the corresponding material release position, thereby reducing the possibility of interference between the second clamping mechanism and other structures.

In an embodiment, the transfer method further includes:
driving the support module to rotate about a second rotation center line using the transfer apparatus, such that the clamping apparatus switches from a fourth state to the third state, where when the clamping apparatus is in the fourth state, a first rotation center line extends along an up-and-down direction, and an arrangement direction of the clamping apparatus at a position to release the battery cells onto the corresponding conveying apparatus and the corresponding conveying apparatus is the up-and-down direction.

In the embodiments of this disclosure, the clamping apparatus switches from the fourth state to the third state, such that tape sticking surfaces of the battery cells clamped by the clamping apparatus can be disposed upwards, which is conducive to tape sticking.

In an embodiment, the driving the support module to move using the transfer apparatus, such that the first clamping mechanism with the battery cells clamped moves to a corresponding pre-placement position, where a state of the clamping apparatus corresponding to the first clamping mechanism at the corresponding pre-placement position is a third state includes:

during movement of the second clamping mechanism from the corresponding material release position to an idle position, driving the support module to rotate about the first rotation center line using the transfer apparatus so as to swap positions of the first clamping mechanism and the second clamping mechanism, where the corresponding first clamping mechanism is located at the corresponding pre-placement position when the second clamping mechanism is located at the idle position.

In the embodiments of this disclosure, the first clamping mechanism is at the pre-placement position by swapping the positions of the first clamping mechanism and the second clamping mechanism, and the second clamping mechanism at the idle position is far away from the corresponding conveying apparatus, which is convenient for the first clamping mechanism to release the battery cells.

Beneficial Effects

The first driving module of the embodiments of this disclosure drives the first clamping mechanism to rotate, such that the clamping apparatus can switch between the first state and the second state. When the clamping apparatus grabs the battery cells from the grouping table, the clamping apparatus may be in the second state, and the opening direction of the clamping opening of the first clamping mechanism and the opening direction of the clamping opening of the second clamping mechanism can tend to be consistent, which is convenient for the clamping apparatus to jointly grab the plurality of groups of grouped battery cells in the same orientation at one time. When the clamping apparatus clamps the plurality of groups of grouped battery cells and places the plurality of groups of grouped battery cells on the conveying apparatus, the clamping opening of the second clamping mechanism corresponding to the clamping apparatus in the second state faces away from the first clamping mechanism, and the battery cells clamped at the clamping opening of the second clamping mechanism can be smoothly released to the conveying apparatus. When it is needed to release the battery cells clamped at the clamping opening of the first clamping mechanism to the conveying apparatus, the first clamping mechanism is driven to rotate using the first driving module, such that the clamping apparatus switches from the second state to the first state. The opening direction of the clamping opening of the first clamping mechanism corresponding to the clamping apparatus in the first state faces away from the second clamping mechanism, and the clamping opening of the first clamping mechanism is no longer shielded by the second clamping mechanism, such that the battery cells clamped by the first clamping mechanism can be smoothly released to the conveying apparatus. Therefore, the clamping apparatus of the embodiments of this disclosure can not only meet the requirement of jointly grabbing the plurality of groups of grouped battery cells on the grouping table in the same orientation at one time, but also smoothly release the plurality of groups of grabbed grouped battery cells onto the corresponding conveying apparatus, thereby better achieving the transfer of the plurality of groups of battery cells.

BRIEF DESCRIPTION OF DRAWINGS

By reading the following detailed description of implementations below, those of ordinary skill in the art become clearly aware of various other advantages and benefits. The drawings are merely intended to illustrate some implementations, but not to limit this disclosure. Moreover, throughout the accompanying drawings, the same reference signs represent the same parts. In the accompanying drawings.

Figure 1:
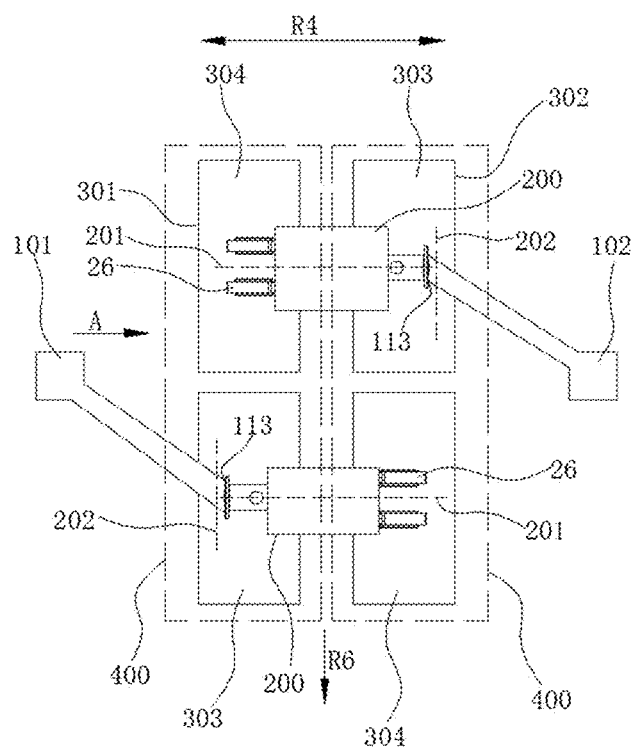
FIG. 1 is a state diagram in which transfer apparatuses drive corresponding clamping apparatuses to transfer battery cells to corresponding conveying apparatuses according to an embodiment of this disclosure, where the state shown in the figure is as follows: a second clamping mechanism of a clamping apparatus corresponding to a first transfer apparatus releases battery cells onto a first material release position of a second conveying apparatus, and a second clamping mechanism of a clamping apparatus corresponding to a second transfer apparatus releases battery cells onto a first material release position of a first conveying apparatus.

DESCRIPTION OF REFERENCE SIGNS support assembly 1; support module 11; rack body 111; mounting arm 112; connecting portion 113; first driving module 12; driver 121; mounting seat 122; first clamping mechanism 21; second clamping mechanism 22; clamping opening 23; mounting portion 24; regulation assembly 25; main seat 251; second driving module 252; screw rod 253; first thread 2531; second thread 2532; regulation seat 254; clamping assembly 26; telescopic piece 261; clamping jaw 262; clamping portion 2621; first transfer apparatus 101; second transfer apparatus 102; clamping apparatus 200; first rotation center line 201; second rotation center line 202; first conveying apparatus 301; second conveying apparatus 302; second material release position 303; first material release position 304; and safety region 400.

DETAILED DESCRIPTION OF EMBODIMENTS

Hereinafter, embodiments of technical solutions of this disclosure will be described in detail with reference to the accompanying drawings. The following embodiments are merely intended to describe the technical solutions of this disclosure more clearly, and are merely exemplary but without hereby limiting the scope of protection of this disclosure.

Unless otherwise defined, all technical and scientific terms used herein bear the same meanings as what is normally understood by a person skilled in the technical field of this disclosure. The terms used herein are merely intended to describe specific embodiments but not to limit this disclosure. The terms "include", "comprise", and "have" and any variations thereof used in the embodiments of this disclosure are intended as non-exclusive inclusion.

In the description of the embodiments of this disclosure, the technical terms "first", "second" and "third" are merely intended to distinguish between different items but not intended to indicate or imply relative importance or implicitly specify the quantity of the indicated technical features, specific order, or order of precedence. In the description of the embodiments of this disclosure, unless otherwise expressly specified, "a plurality of" means two or more.

Reference to "embodiment" herein means that a specific feature, structure or characteristic described with reference to the embodiments may be included in at least one embodiment of this disclosure. The presence of the phrase in various places in the specification does not necessarily mean the same embodiment, nor is it a separate or alternative embodiment that is mutually exclusive with other embodiments. A person skilled in the art explicitly and implicitly understands that the embodiments described herein may be combined with other embodiments.

In the description of the embodiments of this disclosure, the term "and/or" is only an association relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this disclosure, unless otherwise explicitly provided and limited, the technical terms such as "mount", "connect", "couple", and "fix" should be understood broadly, which, for example, may refer to a fixed connection, a detachable connection, or an integral connection; which may refer to a mechanical connection or an electrical connection; which may refer to a direct connection or an indirect connection via an intermediate medium; which may also refer to a communication between the insides of two elements, or an interaction relationship between two elements. For those of ordinary skill in the art, the specific meanings of the above-mentioned terms in the embodiments of this disclosure may be understood according to specific situations.

In the description of the embodiments of this disclosure, unless otherwise explicitly provided and limited, the technical term "contact" should be broadly understood, which may be direct contact, contact using an intermediate medium layer, contact with no interaction force between the two in contact, or contact with interaction force between the two in contact.

In the description of the embodiments of this disclosure, an orientation or positional relationship of the terms "upper", "lower", "top", and "bottom" is an orientation or positional relationship based on the illustration in the drawings. It should be understood that these orientation terms are merely for the convenience of describing this disclosure and simplifying the description, and do not indicate or imply that the indicated apparatus or component is located in the specific orientation or constructed and operated in the specific orientation. Therefore, such terms are not to be understood as a limitation on this disclosure.

At present, new energy batteries are more and more widely used in life and industry. The new energy batteries are not only used in energy storage power systems such as hydro, thermal, wind, and solar power stations, but also widely used in electric means of transport such as electric bicycles, electric motorcycles, and electric vehicles, and used in many other fields such as aerospace. The market demand for traction batteries keeps soaring with the increase of the application fields of the traction batteries.

As a part of the creative concept of this disclosure, before describing the embodiments of this disclosure, it is needed to analyze the reasons why a clamping apparatus is difficult to meet the transfer requirements of a plurality of groups of battery cells in the related art, and the technical solutions of the embodiments of this disclosure are obtained through reasonable analysis.

Battery modules may be single-row battery modules and double-row battery modules respectively. In the process of producing the battery modules, two battery cells need to be assembled to form grouped battery cells, for example, the grouped battery cells are single-row grouped battery cells or double-row grouped battery cells, the single-row battery modules are mainly composed of single-row grouped battery cells, and the double-row battery modules are mainly composed of double-row grouped battery cells. After being assembled on a grouping table, the single-row grouped battery cells or the double-row grouped battery cells need to be conveyed to a conveying apparatus using a clamping apparatus, and a plurality of groups of grouped battery cells on the grouping table are spaced apart in sequence.

In the related art, the clamping apparatus includes two clamping mechanisms arranged along a first direction, the clamping apparatus moves to the grouping table, and the two clamping mechanisms need to jointly grab the plurality of groups of grouped battery cells at one time. In the process of clamping the plurality of groups of grouped battery cells using the clamping apparatus, the two clamping mechanisms of the clamping apparatus move along the same orientation, opening directions of clamping openings of the two clamping mechanisms need to be consistent along the first direction, such that the two clamping mechanisms can jointly grab the plurality of groups of grouped battery cells on the grouping table at one time, and the clamping openings are configured to allow the battery cells to move in or out of the corresponding clamping mechanisms along the first direction. The opening directions of the clamping openings of the two clamping mechanisms are consistent along the first direction, so it is inevitable that the opening direction of the clamping opening of one clamping mechanism faces towards the other clamping mechanism to be shielded by the corresponding clamping mechanism, and in the related art, the opening directions of the clamping openings of the two clamping mechanisms are not adjustable.

When the opening directions of the clamping openings of two clamping mechanisms face the conveying apparatus along the first direction, since the opening direction of the clamping opening of one clamping mechanism faces towards the other clamping mechanism to be shielded by the corresponding clamping mechanism, the clamping mechanism with the clamping opening shielded cannot release the battery cells onto the conveying apparatus, and the clamping mechanism with the clamping opening shielded is far away from the conveying apparatus and cannot release the grouped battery cells onto the conveying apparatus. When the clamping mechanism with the clamping opening shielded in the two clamping mechanisms is closer to the conveying apparatus than the other clamping mechanism, the opening directions of the clamping openings of the two clamping mechanisms face away from the conveying apparatus, and the clamping mechanisms cannot release the grouped battery cells onto the conveying apparatus. Therefore, it is difficult for the two clamping mechanisms of the clamping apparatus in the related art to jointly grab the plurality of groups of grouped battery cells from the grouping table in the same orientation at one time and transfer the grouped battery cells to the conveying apparatus.

If the opening directions of the clamping openings of the clamping mechanisms can be adjusted, the opening directions of the clamping openings in the state of grabbing the plurality of groups of grouped battery cells and the opening directions in the state of placing batteries on the conveying apparatus can be changed, which can not only meet the requirement that the clamping apparatus can jointly grab the plurality of groups of grouped battery cells on the grouping table in the same orientation at one time, but also transfer and release the plurality of groups of grouped battery cells jointly grabbed at one time to the conveying apparatus.

The solutions of the embodiments of this disclosure can be applied to, but not limited to, the transfer of the grouped battery cells, and can also be applied to other situations where a plurality of objects need to be grabbed in the same orientation at one time and rotatably released to corresponding conveying apparatus. The solutions of the embodiments of this disclosure can also be configured for a battery production line including a corresponding clamping apparatus.

Electrical apparatuses are apparatuses that use electric energy as energy and achieve corresponding functions by consuming electric energy. Exemplarily, the electrical apparatuses may be, but are not limited to, a mobile phone, a tablet, a notebook computer, an electric toy, an electric tool, an electric power cart, an electric vehicle, a ship, a spacecraft, or the like. The electric toy may include a fixed or mobile electric toy, for example, a game console, an electric toy car, an electric toy ship, and an electric toy airplane. The spacecraft may include an airplane, a rocket, a space shuttle, a spaceship, and the like.

A vehicle is used as an example of the electrical apparatus according to an embodiment of this disclosure.

The vehicle provided by an embodiment of this disclosure may be an oil-fueled vehicle, a natural gas vehicle, or a new energy vehicle. The new energy vehicle may be a battery electric vehicle, a hybrid electric vehicle, an extended-range electric vehicle, or the like. A battery pack is disposed inside the vehicle. The battery pack may be disposed at the bottom, front, or rear of the vehicle. The battery pack may be configured to supply power to the vehicle. For example, the battery pack may serve as an operating power supply of the vehicle. The vehicle may further include a controller and a motor. The controller may be configured to control the battery pack to supply power to the motor. For example, the battery pack may be configured to meet operating power usage requirements of the vehicle that is being started, navigated, or running.

In some embodiments of this disclosure, the battery pack serves not only as an operating power supply of the vehicle, but also as a driving power supply of the vehicle to provide driving power for the vehicle in place of or partially in place of fuel oil or natural gas.

The battery pack of the embodiments of this disclosure is mainly composed of battery cells, or grouped battery cells form corresponding battery modules, and then a main structure of the battery pack is formed by the corresponding battery modules.

The quantity of the battery cells may be multiple, the plurality of battery cells may be connected in series, parallel, or series-parallel, where being connected in series-parallel means a combination of series and parallel connections of the plurality of battery cells. The plurality of battery cells may be directly connected in series, parallel, or series-parallel, and then the whole of the plurality of battery cells may be placed into a case. Certainly, the plurality of battery cells may be connected in series, parallel, or series-parallel to form a battery module, and then a plurality of battery modules may be connected in series, parallel, or series-parallel to form a whole, and the whole formed by connecting the plurality of battery modules in series, parallel, or series-parallel may be placed in the case. The battery pack may further include other structures. For example, the battery pack may further include a busbar component. The busbar component is configured to implement electrical connection between the plurality of battery cells.

Each battery cell refers to a basic unit that can achieve the mutual conversion between chemical energy and electric energy.

In the embodiments of this disclosure, the battery cell may be a secondary battery, and the secondary battery is a battery cell that is reusable through activation of an active material in the battery cell by charging the battery cell that is discharged.

In the embodiments of this disclosure, the battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead storage battery, or the like. The specific type of the battery cell is not limited by the embodiments of this disclosure.

An embodiment of this disclosure provides a battery production line. Referring to FIGS. 1 to 8, the battery production line includes transfer apparatuses, clamping apparatuses 200, a grouping table and conveying apparatuses. The grouping table is configured to place grouped battery cells, and the transfer apparatuses drive the clamping apparatuses 200 to grab the grouped battery cells from the grouping table. The conveying apparatuses are configured to receive and convey the battery cells clamped by the clamping apparatuses 200. The transfer apparatuses drive the clamping apparatuses 200 to move, so as to grab the battery cells on the grouping table and transport the battery cells to the conveying apparatuses.

Exemplarily, the transfer apparatuses may be robots configured for transfer.

Exemplarily, referring to FIGS. 1 to 8, the transfer apparatuses shown in the figures are used to indicate the general positions of the transfer apparatuses, and specific structures of the transfer apparatuses are not shown in the figures.

Exemplarily, referring to FIGS. 1 to 9, the complete conveying apparatuses are not shown in the figures, and only trays of the conveying apparatuses are shown in the figures.

For each clamping apparatus 200 of the embodiments of this disclosure, referring to FIGS. 6, 7 and 10 to 14, the clamping apparatus 200 of the embodiments of this disclosure has a first state and a second state, and the clamping apparatus 200 includes a support assembly 1 and clamping mechanisms. The support assembly 1 includes a support module 11 and a first driving module 12 disposed on the support module 11. The clamping mechanisms are disposed on the support assembly 1, a quantity of the clamping mechanisms is at least two, at least one clamping mechanism is a first clamping mechanism 21, and at least one clamping mechanism is a second clamping mechanism 22. The first clamping mechanism 21 and the second clamping mechanism 22 are arranged along a first direction. When the clamping apparatus 200 is in the first state, an opening direction of a clamping opening 23 of the first clamping mechanism 21 faces away from the second clamping mechanism 22 along the first direction. When the clamping apparatus 200 is in the second state, the opening direction of the clamping opening 23 of the first clamping mechanism 21 faces towards the second clamping mechanism 22 along the first direction, such that the opening direction of the clamping opening 23 of the first clamping mechanism 21 is consistent with an opening direction of a clamping opening 23 of the second clamping mechanism 22. The first driving module 12 is configured to drive the first clamping mechanism 21 to rotate, such that the clamping apparatus 200 can switch between the first state and the second state, and each clamping opening 23 is configured to allow the battery cell to move in or out of the corresponding clamping mechanism along the first direction.

Figure 11:
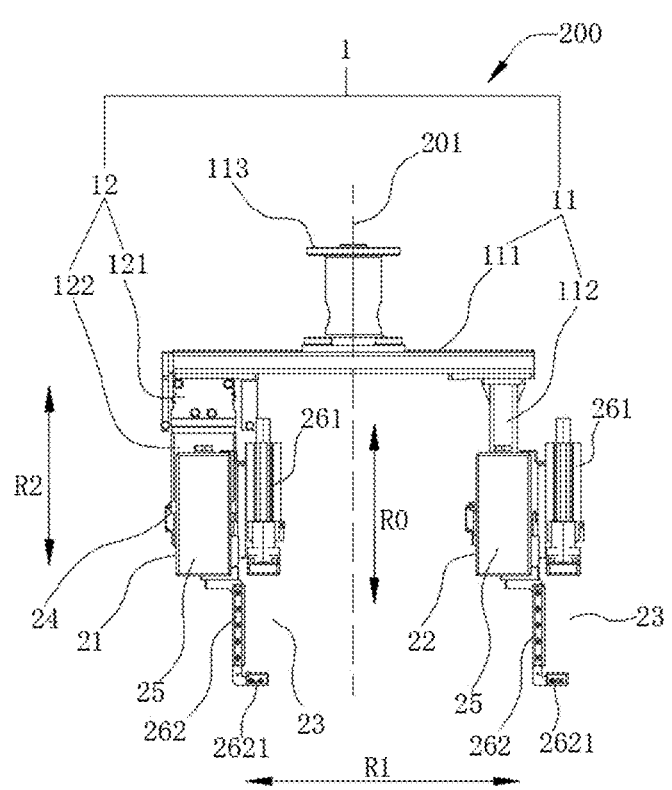
FIG. 11 is a schematic structural diagram of a clamping apparatus according to an embodiment of this disclosure, where a first direction is shown in the figure.

In the embodiments of this disclosure, referring to FIG. 11, the first direction is a direction indicated by arrow R1 in the figure.

The support assembly 1 is mainly configured to support the clamping mechanisms, and the clamping mechanisms disposed on the support assembly 1 can move along with the support assembly 1.

Exemplarily, the first clamping mechanism 21 and the second clamping mechanism 22 are arranged along the first direction. When the clamping apparatus 200 grabs a plurality of groups of grouped battery cells arranged in sequence from the grouping table, the opening direction of the clamping opening 23 of the first clamping mechanism 21 is consistent with the opening direction of the clamping opening 23 of the second clamping mechanism 22, the opening direction of the clamping opening 23 of the first clamping mechanism 21 and the opening direction of the clamping opening 23 of the second clamping mechanism 22 are arranged along the first direction, the opening direction of the clamping opening 23 of the first clamping mechanism 21 faces towards the second clamping mechanism 22, and the clamping apparatus 200 is in the second state.

Exemplarily, referring to FIGS. 6, 9, 10 and 11, the state of the clamping apparatus 200 shown in the figures is the second state.

Figure 7:
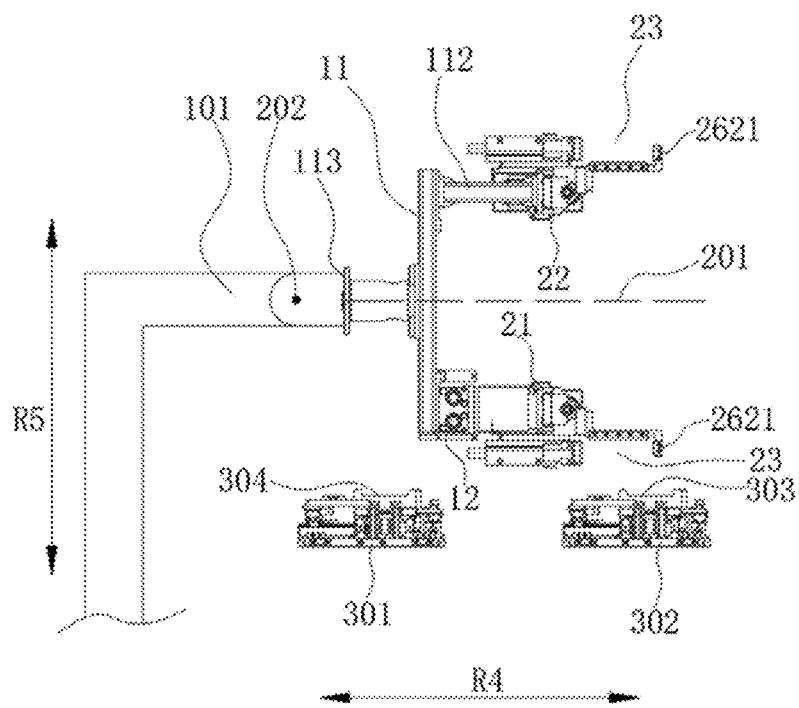
FIG. 7 is a state diagram in which a first clamping mechanism of a clamping apparatus corresponding to a first transfer apparatus is located at a corresponding pre-placement position according to an embodiment of this disclosure, where the clamping apparatus is in a third state and a first state, and the third state and the first state of the clamping apparatus coexist.

Exemplarily, referring to FIG. 7, the state of the clamping apparatus 200 shown in the figure is the first state.

In the embodiments of this disclosure, the first driving module 12 drives the first clamping mechanism 21 to rotate, such that the clamping apparatus 200 can switch between the first state and the second state. When the clamping apparatus 200 grabs the battery cells from the grouping table, the clamping apparatus 200 may be in the second state, and the opening direction of the clamping opening 23 of the first clamping mechanism 21 and the opening direction of the clamping opening 23 of the second clamping mechanism 22 can tend to be consistent, which is convenient for the clamping apparatus 200 to jointly grab the plurality of groups of grouped battery cells in the same orientation at one time. When the clamping apparatus 200 clamps the plurality of groups of grouped battery cells and places the plurality of groups of grouped battery cells on the conveying apparatus, the clamping opening 23 of the second clamping mechanism 22 corresponding to the clamping apparatus 200 in the second state faces away from the first clamping mechanism 21, and the battery cells clamped at the clamping opening 23 of the second clamping mechanism 22 can be smoothly released to the conveying apparatus. When it is needed to release the battery cells clamped at the clamping opening 23 of the first clamping mechanism 21 to the conveying apparatus, the first clamping mechanism 21 is driven to rotate using the first driving module 12, such that the clamping apparatus 200 switches from the second state to the first state. The opening direction of the clamping opening 23 of the first clamping mechanism 21 corresponding to the clamping apparatus 200 in the first state faces away from the second clamping mechanism 22, and the clamping opening 23 of the first clamping mechanism 21 is no longer shielded by the second clamping mechanism 22, such that the battery cells clamped by the first clamping mechanism 21 can be smoothly released to the conveying apparatus. Therefore, the clamping apparatus 200 of the embodiments of this disclosure can not only meet the requirement of jointly grabbing the plurality of groups of grouped battery cells on the grouping table in the same orientation at one time, but also smoothly release the plurality of groups of grabbed grouped battery cells onto the corresponding conveying apparatus, thereby better achieving the transfer of the plurality of groups of battery cells.

It can be understood that when the opening direction of the clamping opening 23 of the first clamping mechanism 21 faces towards the second clamping mechanism 22, the clamping apparatus 200 is not necessarily in the second state, and the opening direction of the clamping opening 23 of the first clamping mechanism 21 may be not consistent with the opening direction of the clamping opening 23 of the second clamping mechanism 22.

Figure 6:
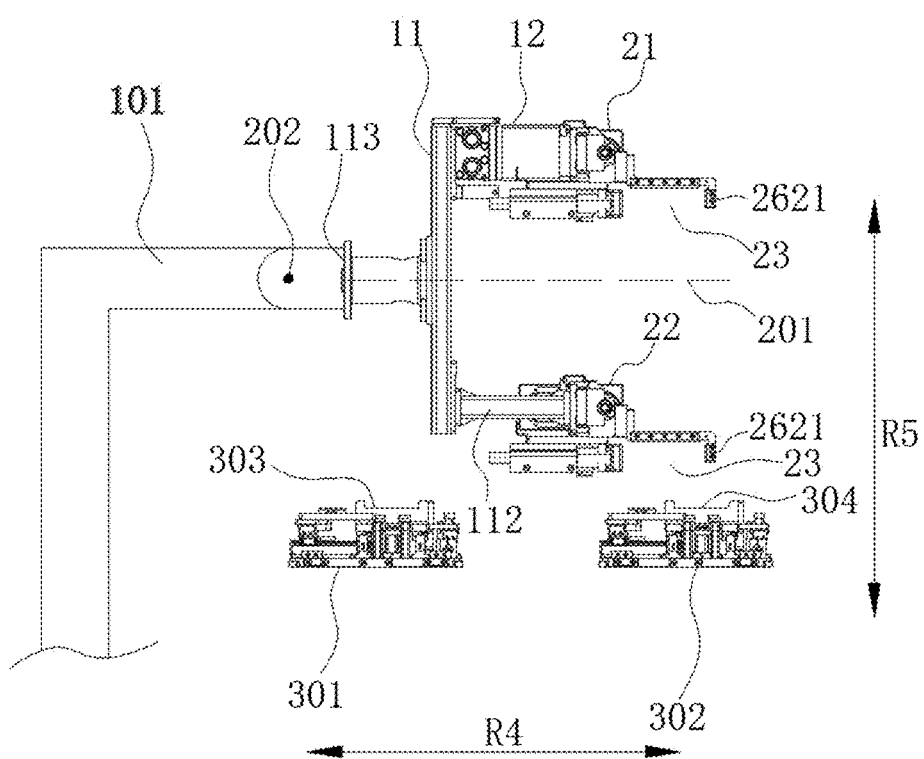
FIG. 6 is a state diagram in which a second clamping mechanism of a clamping apparatus corresponding to a first transfer apparatus is located at a corresponding pre-placement position according to an embodiment of this disclosure, where the clamping apparatus is in a third state and a second state, and the third state and the second state of the clamping apparatus coexist.

In an embodiment, referring to FIGS. 6 and 7, the clamping apparatus 200 has a third state, the support module 11 is disposed on the transfer apparatus, and the transfer apparatus can drive the support module 11 to rotate about a first rotation center line 201 so as to swap positions of the first clamping mechanism 21 and the second clamping mechanism 22. When the clamping apparatus 200 is at a position to release the battery cells onto the corresponding conveying apparatus, an arrangement direction of the clamping apparatus 200 and the corresponding conveying apparatus is an up-and-down direction, and when the clamping apparatus 200 is in the third state, the first rotation center line 201 intersects the up-and-down direction.

In the embodiments of this disclosure, referring to FIGS. 5 to 8, the up-and-down direction is a direction indicated by arrow R5 in the figure.

A receiving direction of the conveying apparatus is a direction in which the conveying apparatus receives to-be-conveyed objects, the battery cells are placed above the conveying apparatus, and the receiving direction of the conveying apparatus is arranged along the up-and-down direction. The first rotation center line 201 intersects the up-and-down direction, that is, the first rotation center line 201 intersects the receiving direction of the conveying apparatus.

Exemplarily, referring to FIGS. 6 and 7, when the clamping apparatus 200 is in the third state, the first rotation center line 201 and the up-and-down direction are perpendicular.

Figure 8:
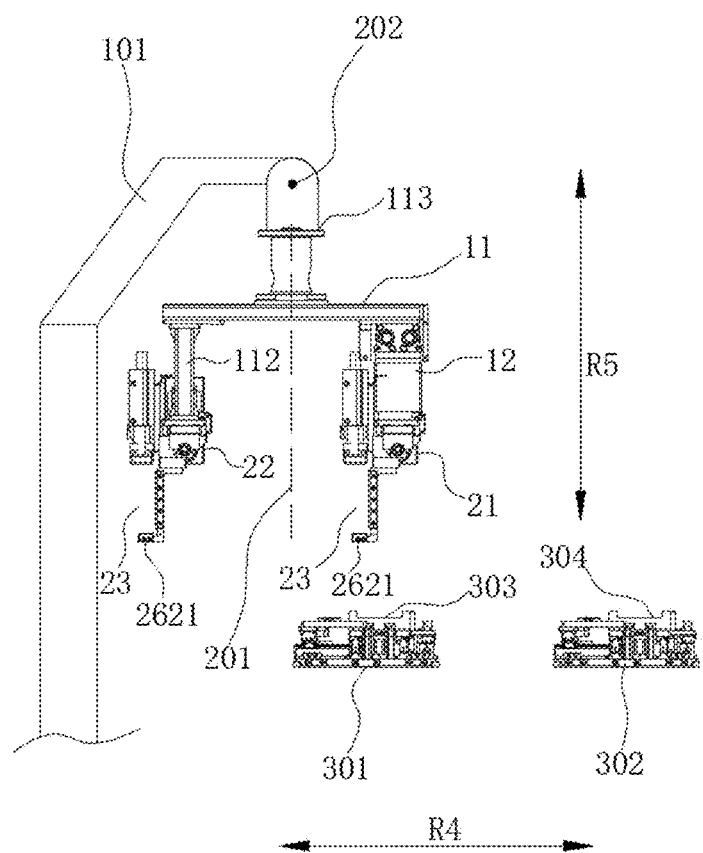
FIG. 8 is a schematic diagram in which a clamping apparatus corresponding to a first transfer apparatus is in a fourth state according to an embodiment of this disclosure.
Figure 9:
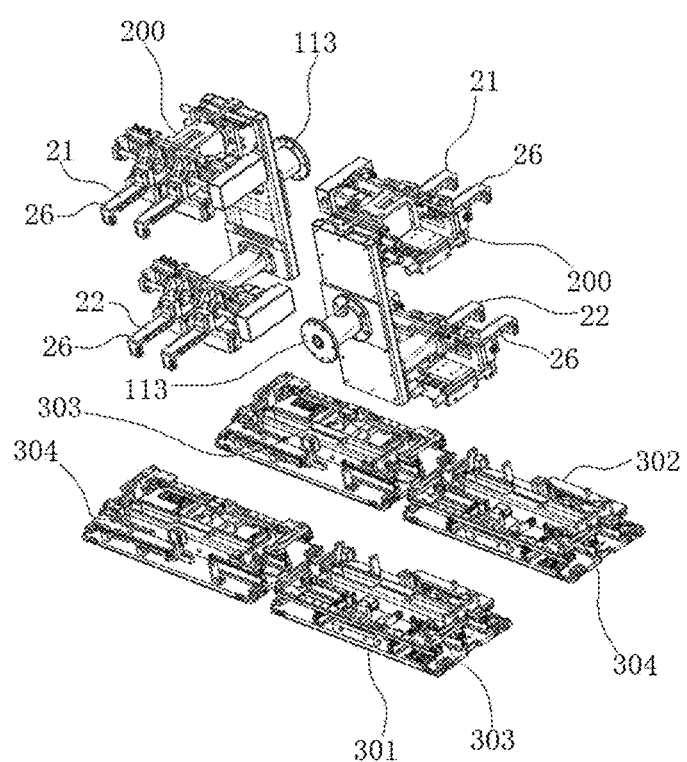
FIG. 9 is a transfer state diagram in which two clamping apparatuses respectively convey grouped battery cells to corresponding conveying apparatuses according to an embodiment of this disclosure, where second clamping mechanisms of the two clamping apparatuses are located at corresponding pre-placement positions.

Exemplarily, referring to FIGS. 6 to 8, the first rotation center line 201 intersects the opening direction of the clamping opening.

Exemplarily, the second clamping mechanism 22 releases the clamped battery cells onto the conveying apparatus. After the second clamping mechanism 22 releases the corresponding battery cells, the transfer apparatus drives the support module 11 to rotate about the first rotation center line 201 so as to swap positions of the first clamping mechanism 21 and the second clamping mechanism 22, and the first clamping mechanism 21 releases the clamped battery cells onto the conveying apparatus after the positions are swapped.

In the embodiments of this disclosure, since the first rotation center line 201 corresponding to the clamping apparatus 200 in the third state intersecting the up-and-down direction, it is conducive to adjusting the opening direction of the clamping opening 23 to face the conveying apparatus, and it is convenient for the clamping apparatus 200 to release the clamped battery cells onto the conveying apparatus. Since the transfer apparatus drives the clamping apparatus 200 in the third state to rotate, the positions of the first clamping mechanism 21 and the second clamping mechanism 22 are swapped, the battery cells clamped by one of the first clamping mechanism 21 and the second clamping mechanism 22 can be released to the conveying apparatus first, and then the positions of the first clamping mechanism 21 and the second clamping mechanism 22 are exchanged, the battery cells clamped by the other of the first clamping mechanism 21 and the second clamping mechanism 22 are released to the conveying apparatus, such that the battery cells clamped by the first clamping mechanism 21 and the second clamping mechanism 22 are placed to the conveying apparatus in sequence, and thus the battery cells clamped by the clamping apparatus 200 from the grouping table can be transferred to the conveying apparatus.

It can be understood that the grouped battery cells on the grouping table are configured to be assembled into a battery module, and tape needs to be stuck to surfaces of the grouped battery cells to bond the plurality of groups of grouped battery cells into the battery module. The surfaces of the battery cells on the grouping table where adhesive materials for bonding into the battery module are arranged are tape sticking surfaces. In the normal placing state of the battery cells, the tape sticking surfaces do not face upwards, and the tape sticking surfaces are roughly at one side of the battery cells along a horizontal direction. For the grouped battery cells grabbed from the grouping table, tape will be stuck to the tape sticking surfaces later, and it is needed to turn the tape sticking surfaces roughly at one side of the battery cells along the horizontal direction upwards so as to facilitate tape sticking.

In an embodiment, referring to FIGS. 1 and 6 to 8, the clamping apparatus 200 further has a fourth state, and when the clamping apparatus 200 is in the fourth state, the first rotation center line 201 extends in the up-and-down direction; and the transfer apparatus can drive the support module 11 to rotate about a second rotation center line 202, such that the clamping apparatus 200 can switch between the third state and the fourth state, and the second rotation center line 202 intersects the first rotation center line 201.

Exemplarily, referring to FIG. 8, the clamping apparatus 200 shown in the figure is in the fourth state.

In the embodiments of this disclosure, the first rotation center line 201 corresponding to the clamping apparatus 200 in the fourth state extends in the up-and-down direction, which is convenient for the clamping mechanism to clamp the battery cells on the grouping table at the corresponding clamping opening 23. The transfer apparatus drives the support module 11 to rotate about the second rotation center line 202, such that the clamping apparatus 200 switches from the fourth state to the third state, and the transfer apparatus drives the clamping apparatus 200 to rotate about the first rotation center line 201 in the third state, such that the tape sticking surfaces of the battery cells can be rotated to be arranged approximately upwards, which is convenient for performing tape sticking on the tape sticking surfaces of the battery cells on the conveying apparatus.

In an embodiment, referring to FIGS. 1 to 8, a quantity of conveying apparatuses is two, an arrangement direction of the two conveying apparatuses is a fourth direction, the transfer apparatus is disposed at one side of each conveying apparatus facing away from the other conveying apparatus along the fourth direction, the transfer apparatus at each side is correspondingly provided with the clamping apparatus 200, and conveying directions of the two conveying apparatuses are consistent.

In the embodiments of this disclosure, referring to FIGS. 1 to 8, the fourth direction is a direction indicated by arrow R4 in the figure.

In the embodiments of this disclosure, referring to FIGS. 1 to 4, the conveying direction of the conveying apparatus is a direction indicated by arrow R6 in the figure.

In the embodiments of this disclosure, the clamping apparatus 200 is driven to move using the transfer apparatus at each side, such that the grouped battery cells clamped by the clamping apparatus 200 are released to the corresponding conveying apparatus, each conveying apparatus is configured to receive and release the grouped battery cells, and the two conveying apparatuses drive the received grouped battery cells to the next processing position so as to stack the grouped battery cells. The conveying directions of the two conveying apparatuses are consistent, and the battery cells on the two conveying apparatuses are conveyed to the next conveying position together for stacking.

It can be understood that a manipulator at a stacking station grabs a group of grouped battery cells from two conveying apparatuses separately, and the manipulator transfers the two groups of grouped battery cells grabbed from the two conveying apparatuses to a stacking table together, and then releases the two groups of grouped battery cells onto the stacking table at a normal placement posture for stacking. Exemplarily, the posture of the battery cells on the grouping table is the normal placement posture of the battery cells, poles of the battery cells are arranged upwards, and the tape sticking surfaces are located at one side of the battery cells roughly along the horizontal direction. The battery cells on the grouping table are transferred to two conveying apparatuses using the clamping apparatus 200, and the poles of the battery cells on each conveying apparatus face the other conveying apparatus along the fourth direction. Only after the manipulator in the subsequent stacking station grabs one group of grouped battery cells from the two conveying apparatuses separately, the two groups of grouped battery cells grabbed by the manipulator at one time can be released to the stacking table in the normal placement posture with electrodes facing upwards in an overturning manner for stacking. Therefore, among the battery cells transferred to the conveying apparatuses by the clamping apparatus 200, the poles of the battery cells on each conveying apparatus face the other conveying apparatus along the fourth direction, that is, the poles of the battery cells on each conveying apparatus face a region between the two conveying apparatuses along the fourth direction.

It can be understood that when the poles of the battery cells on the grouping table face upwards in the normal placement posture, the poles of the battery cells clamped by the clamping apparatus 200 from the grouping table face the support assembly 1.

In an embodiment, referring to FIGS. 1 to 4, each support module 11 is provided with a connecting portion 113 connected to the corresponding transfer apparatus, the connecting portion 113 is located at one side of the corresponding support module 11 facing away from the corresponding clamping mechanism along a preset direction, and the preset direction is a direction along the first rotation center line 201. For the two conveying apparatuses, one conveying apparatus is a first conveying apparatus 301, the other conveying apparatus is a second conveying apparatus 302, the transfer apparatus at one side of the first conveying apparatus 301 facing away from the second conveying apparatus 302 along the fourth direction is a first transfer apparatus 101, the first transfer apparatus 101 drives the corresponding clamping apparatus 200 to move so as to release the corresponding battery cells onto the second conveying apparatus 302, the transfer apparatus at one side of the second conveying apparatus 302 facing away from the first conveying apparatus 301 along the fourth direction is a second transfer apparatus 102, and the second transfer apparatus 102 drives the corresponding clamping apparatus 200 to move so as to release the corresponding battery cells onto the first conveying apparatus 301.

It should be explained that, referring to FIGS. 1 to 4, the battery cells clamped by the clamping apparatus 200 corresponding to the first transfer apparatus 101 are released to the second conveying apparatus 302, and the battery cells clamped by the clamping apparatus 200 corresponding to the second transfer apparatus 102 are released to the first conveying apparatus 301, that is, the two transfer apparatuses drive the corresponding clamping apparatuses 200 to release the battery cells onto the farther conveying apparatuses.

It should be explained that referring to FIGS. 1 to 4, the poles of the battery cells clamped by the clamping apparatus 200 from the grouping table face the support assembly 1, that is, the poles of the battery cells clamped by the clamping apparatus 200 from the grouping table face the connecting portion 113 of the support module 11 of the support assembly 1, and the battery cells are clamped at the clamping opening 23.

Exemplarily, referring to FIG. 11, the preset direction is a direction indicated by arrow R0 in the figure.

Referring to FIG. 1, when the clamping apparatus 200 corresponding to the first transfer apparatus 101 releases the clamped battery cells onto the second conveying apparatus 302 in the third state, since the poles of the battery cells on the second conveying apparatus 302 face the first conveying apparatus 301 and the poles of the battery cells clamped by the clamping apparatus 200 from the grouping table face the connecting portion 113, the corresponding connecting portion 113 is located at one side of the corresponding clamping mechanism facing towards the first conveying apparatus 301 along the fourth direction. Referring to FIG. 1, when the clamping apparatus 200 corresponding to the second transfer apparatus 102 releases the clamped battery cells onto the first conveying apparatus 301 in the third state, since the poles of the battery cells on the first conveying apparatus 301 face the second conveying apparatus 302 and the poles of the battery cells clamped by the clamping apparatus 200 from the grouping table face the connecting portion 113, the corresponding connecting portion 113 is located at one side of the corresponding clamping mechanism facing towards the second conveying apparatus 302 along the fourth direction. Therefore, the transfer apparatus at each side points to the corresponding transfer apparatus at the other side along the fourth direction, the corresponding connecting portion 113 and the corresponding clamping mechanism are arranged in sequence, and the corresponding clamping mechanism is located between the corresponding connecting portion 113 and the corresponding transfer apparatus at the other side along the fourth direction.

In the embodiments of this disclosure, when the poles of the battery cells clamped at the clamping opening 23 face the support assembly 1, the poles of the battery cells at the clamping opening 23 face the corresponding connecting portion 113. The two transfer apparatuses both drive the corresponding clamping apparatuses 200 to release the battery cells onto the farther conveying apparatuses, the poles of the battery cells on the conveying apparatuses face the region between the two conveying apparatuses, and the poles of the battery cells at the clamping openings 23 face the corresponding connecting portions 113, such that when the clamping apparatuses 200 are in the third state, the clamping mechanism corresponding to the transfer apparatus at each side is located between the corresponding connecting portion 113 and the corresponding transfer apparatus at the other side along the fourth direction, one side of the support module 11 facing towards the corresponding transfer apparatus along the fourth direction has enough telescopic space for the transfer apparatus to stretch out and draw back to move, and thus, the clamping apparatuses 200 corresponding to the transfer apparatuses at both sides can avoid each other, and the possibility of interference between the clamping apparatuses 200 corresponding to the transfer apparatuses at both sides is reduced. Furthermore, when the clamping apparatuses 200 are in the third state, the clamping mechanism corresponding to the transfer apparatus at each side is located between the corresponding connecting portion 113 and the corresponding transfer apparatus at the other side along the fourth direction, and a size of the transfer apparatus at each side along the fourth direction can be set to be smaller, which can meet the requirement that the corresponding clamping apparatus 200 moves to the farther conveying apparatus to release the battery cells, which is conducive to reducing the space occupation of the transfer apparatus.

In an embodiment, referring to FIGS. 1 to 5, the battery production line is provided with safety regions 400, the clamping apparatus 200 driven by the transfer apparatus at each side is provided with the corresponding safety region 400, the safety regions 400 corresponding to the clamping apparatuses 200 driven by the transfer apparatuses at both sides are spaced apart along the fourth direction, the transfer apparatus at each side is located at one side of the corresponding safety region 400 facing away from the safety region 400 corresponding to the transfer apparatus at the other side along the fourth direction, and the transfer apparatus at each side can drive the corresponding clamping apparatus 200 to move into the corresponding safety region 400.

The transfer apparatus at each side is located at one side of the corresponding safety region 400 facing away from the safety region 400 corresponding to the transfer apparatus at the other side along the fourth direction, that is, the safety region 400 corresponding to each clamping apparatus 200 is closer to the corresponding transfer apparatus than the safety region 400 corresponding to the other clamping apparatus 200.

Exemplarily, referring to FIGS. 1 to 4, the safety region 400 corresponding to the clamping apparatus 200 driven by the first transfer apparatus 101 is a safety region at the left side in the figure, and the safety region 400 corresponding to the clamping apparatus 200 driven by the first transfer apparatus 101 is closer to the first transfer apparatus 101 along the fourth direction than the other safety region 400.

Exemplarily, referring to FIGS. 1 to 4, the safety region 400 corresponding to the clamping apparatus 200 driven by the second transfer apparatus 102 is a safety region at the right side in the figure, and the safety region 400 corresponding to the clamping apparatus 200 driven by the second transfer apparatus 102 is closer to the second transfer apparatus 102 along the fourth direction than the other safety region 400.

In the embodiments of this disclosure, since the safety regions 400 are spaced apart along the fourth direction and the safety regions 400 corresponding to the clamping apparatuses 200 are closer to the corresponding transfer apparatuses, when the clamping apparatuses 200 driven by the transfer apparatuses at both sides move in the corresponding safety regions 400 respectively, the clamping apparatuses 200 driven by the transfer apparatuses at both sides hardly interfere with each other, and the transfer apparatuses at both sides hardly interfere with each other. In the process that each clamping apparatus 200 moves from a material release position corresponding to one clamping mechanism to a material release position of the other clamping mechanism, the possibility that the clamping apparatuses 200 driven by the transfer apparatuses at both sides interfere with each other and the two transfer apparatuses interfere with each other can be reduced.

Figure 10:
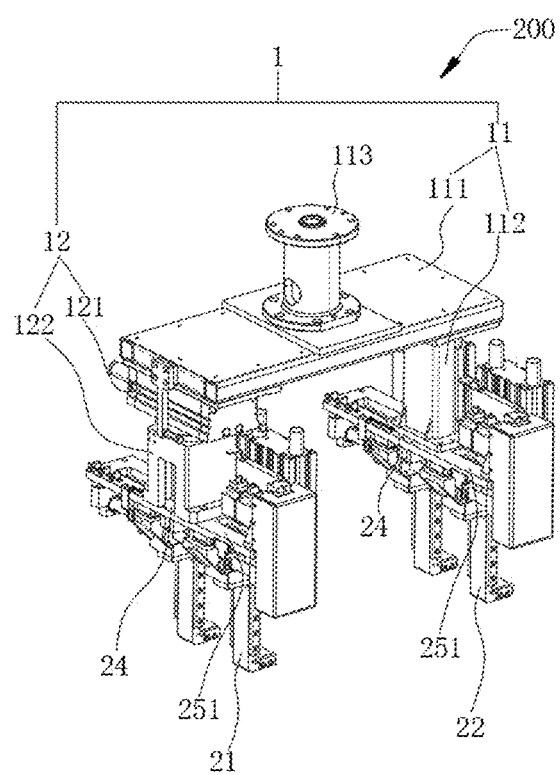
FIG. 10 is a schematic structural diagram of a clamping apparatus according to an embodiment of this disclosure, where a first direction is not shown in the figure.
Figure 12:
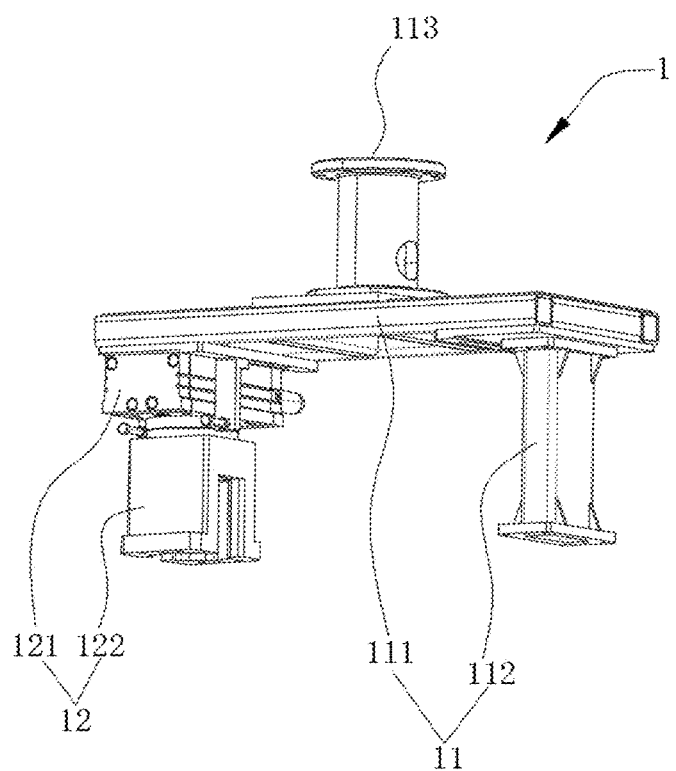
FIG. 12 is a schematic structural diagram of a support assembly according to an embodiment of this disclosure.

In an embodiment, referring to FIGS. 10 to 12, the first driving module 12 includes a driver 121 and a mounting seat 122. The driver 121 is disposed on the support module 11. The mounting seat 122 is at least partially disposed on the driver 121, the driver 121 drives the mounting seat 122 to rotate, and the first clamping mechanism 21 is disposed on the mounting seat 122.

Exemplarily, the driver 121 may be a rotary air cylinder or a motor.

The mounting seat 122 is at least partially disposed on the driver 121, that is, the mounting seat 122 may be partially disposed on the driver 121 or completely disposed on the driver 121.

In the embodiments of this disclosure, the first clamping mechanism 21 is disposed on the mounting seat 122, and the mounting seat 122 is driven to rotate using the driver 121, so as to drive the corresponding first clamping mechanism 21 to rotate. The first clamping mechanism 21 is disposed on the mounting seat 122. The mounting seat 122 is adapted to a shape of a connecting position of the first clamping mechanism 21, which facilitates the better installation of the first clamping mechanism 21. The first clamping mechanism 21 is installed at a position far away from the support module 11 using the mounting seat 122, such that the possibility of interference between the first clamping mechanism 21 and the support module 11 during rotation is reduced.

It can be understood that the first driving module 12 is not limited to the first clamping mechanism 21 being disposed on the mounting seat 122. Exemplarily, the first driving module 12 may not include the mounting seat 122, the first clamping mechanism 21 is disposed on the driver 121, and the driver 121 drives the first clamping mechanism 21 to rotate. Exemplarily, the first clamping mechanism 21 is rotatably connected to the support module 11, and the first clamping mechanism 21 is driven to rotate using the driver 121.

Figure 14:
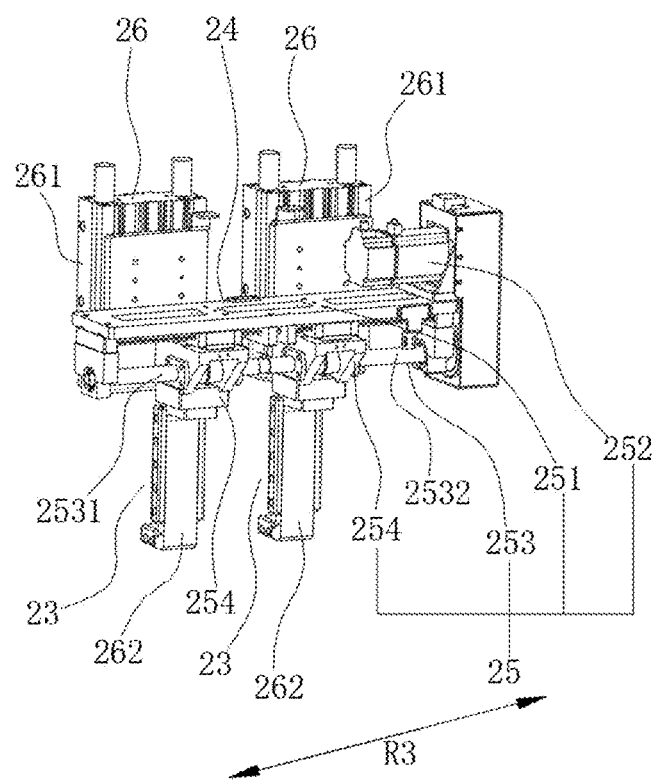
FIG. 14 is a schematic structural diagram of a clamping mechanism according to an embodiment of this disclosure, where a screw rod is shown in the figure.

In an embodiment, referring to FIGS. 10, 11 and 14, each clamping mechanism is provided with a mounting portion 24, the mounting seat 122 is connected to the mounting portion 24 of the corresponding clamping mechanism, the driver 121, the mounting seat 122 and the mounting portion 24 of the corresponding clamping mechanism are sequentially arranged along a second direction, and the second direction intersects the first direction.

In the embodiments of this disclosure, referring to FIG. 11, the second direction is a direction indicated by arrow R2 in the figure.

Exemplarily, referring to FIG. 11, the second direction is perpendicular to the first direction.

In the embodiments of this disclosure, the driver 121, the mounting seat 122 and the mounting portion 24 of the corresponding clamping mechanism are sequentially arranged along the second direction, the mounting seat 122 and the support module 11 are spaced apart, and the driver 121 disposed on the support module 11 is located between the support module 11 and the mounting seat 122 along the second direction. The driver 121 occupies the space between the mounting seat 122 and the support module 11 along the second direction, such that a size of the mounting seat 122 along the second direction can be appropriately reduced and the processing cost is reduced under a condition that a distance between the first clamping mechanism 21 and the support module 11 along the second direction is determined.

It can be understood that the driver 121, the mounting seat 122 and the mounting portion 24 are not limited to being sequentially arranged along the second direction. Exemplarily, the mounting seat 122 may be rotatably connected to the support module 11, the driver 121 may be located at one side of the mounting seat 122 along the first direction, and the driver 121 drives the mounting seat 122 to rotate.

In an embodiment, referring to FIGS. 10 to 12, the second clamping mechanism 22 is partially connected to the support module 11, and the opening direction of the clamping opening 23 of the second clamping mechanism 22 faces away from the first clamping mechanism 21.

The second clamping mechanism 22 is partially connected to the support module 11, the second clamping mechanism 22 will not rotate relative to the support module 11, and the opening direction of the clamping opening 23 of the second clamping mechanism 22 will not change.

The clamping opening 23 of the second clamping mechanism 22 faces away from the first clamping mechanism 21. When the first driving module 12 drives the opening direction of the clamping opening 23 of the first clamping mechanism 21 to face the second clamping mechanism 22, the opening direction of the clamping opening 23 of the first clamping mechanism 21 is consistent with the opening direction of the clamping opening 23 of the second clamping mechanism 22, and the corresponding clamping apparatus 200 is in the second state. When the first driving module 12 drives the opening direction of the clamping opening 23 of the first clamping mechanism 21 to face away from the second clamping mechanism 22, the opening direction of the clamping opening 23 of the first clamping mechanism 21 is opposite to the opening direction of the clamping opening 23 of the second clamping mechanism 22, and the corresponding clamping apparatus 200 is in the first state.

In the embodiments of this disclosure, since the opening direction of the clamping opening 23 of the second clamping mechanism 22 will not change, the clamping opening 23 of the second clamping mechanism 22 always keeps in the state of deviating from the first clamping mechanism 21, and the battery cells clamped by the second clamping mechanism 22 can be released to the conveying apparatus without changing the opening direction of the clamping opening 23 of the second clamping mechanism 22. The second clamping mechanism 22 is partially connected to the support module 11, and the opening direction of the clamping opening 23 of the second clamping mechanism 22 does not change, such that the structure of the clamping apparatus 200 is relatively simple.

It can be understood that the second clamping mechanism 22 of the embodiments of this disclosure is not limited to being partially connected to the support module 11.

Exemplarily, the support assembly 1 further includes a third driving module disposed on the support module 11, and the third driving module drives the second clamping mechanism 22 to rotate, such that the opening direction of the clamping opening 23 of the second clamping mechanism 22 faces towards or away from the first clamping mechanism 21. The first clamping mechanism 21 is driven to rotate using the first driving module 12, and the second clamping mechanism 22 is driven to rotate using the third driving module, such that the opening direction of the clamping opening 23 of the first clamping mechanism 21 and the opening direction of the clamping opening 23 of the second clamping mechanism 22 can be rotated to be consistent, or the opening direction of the clamping opening 23 of the second clamping mechanism 22 can be rotated to face away from the first clamping mechanism 21.

In an embodiment, referring to FIGS. 10 to 12, the support module 11 includes a rack body 111 and a mounting arm 112. The first driving module 12 is disposed on the rack body 111. The mounting arm 112 is connected to the rack body 111, and the second clamping mechanism 22 is partially connected to the mounting arm 112.

Exemplarily, referring to FIGS. 10 to 12, the connecting portion 113 is formed on the rack body 111.

Exemplarily, referring to FIGS. 10 to 12, the connecting portion 113 formed on the rack body 111 is located at one side of the rack body 111 facing away from the mounting arm 112.

In the embodiments of this disclosure, the first driving module 12 disposed on the rack body 111 drives the first clamping mechanism 21 to rotate, and basically a part of the first clamping mechanism 21 will always rotate to a position corresponding to the rack body 111, so it is needed to reserve enough distance between the first clamping mechanism 21 and the rack body 111 so as to reduce the possibility of interference between the first clamping mechanism 21 and the rack body 111. A distance between the clamping opening 23 of the first clamping mechanism 21 and the rack body 111 and the spacing between the clamping opening 23 of the second clamping mechanism 22 and the rack body 111 need to be as close as possible, such that the first clamping mechanism 21 and the second clamping mechanism 22 of the clamping apparatus 200 can grab a plurality of groups of grouped battery cells in the same orientation at one time. Since it is needed to reserve enough distance between the first clamping mechanism 21 and the rack body 111 so as to reduce the possibility of interference between the first clamping mechanism 21 and the rack body 111, the clamping opening 23 of the first clamping mechanism 21 is far away from the rack body 111, and correspondingly, the clamping opening 23 of the second clamping mechanism 22 needs to be kept far away from the rack body 111. The second clamping mechanism 22 is partially connected to the mounting arm 112. On the one hand, the mounting arm 112 is adapted to the shape of the connecting position of the second clamping mechanism 22, which facilitates the better installation of the second clamping mechanism 22. On the other hand, the mounting arm 112 separates the second clamping mechanism 22 from the rack body 111 by a certain distance, such that the distance between the clamping opening 23 of the second clamping mechanism 22 and the rack body 111 and the distance between the clamping opening 23 of the first clamping mechanism 21 and the rack body 111 is as close as possible. The mounting arm 112 is connected to the rack body 111, the mounting arm 112 will not rotate relative to the rack body 111, and correspondingly, the mounting arm 112 will not drive the second clamping mechanism 22 partially connected to the mounting arm 112 to rotate, and the clamping opening 23 of the second clamping mechanism 22 faces away from the first clamping mechanism 21.

It can be understood that the second clamping mechanism 22 is not limited to being partially connected to the mounting arm 112. Exemplarily, the support module 11 may not be provided with the mounting arm 112, and the second clamping mechanism 22 is partially connected to the rack body 111.

Figure 13:
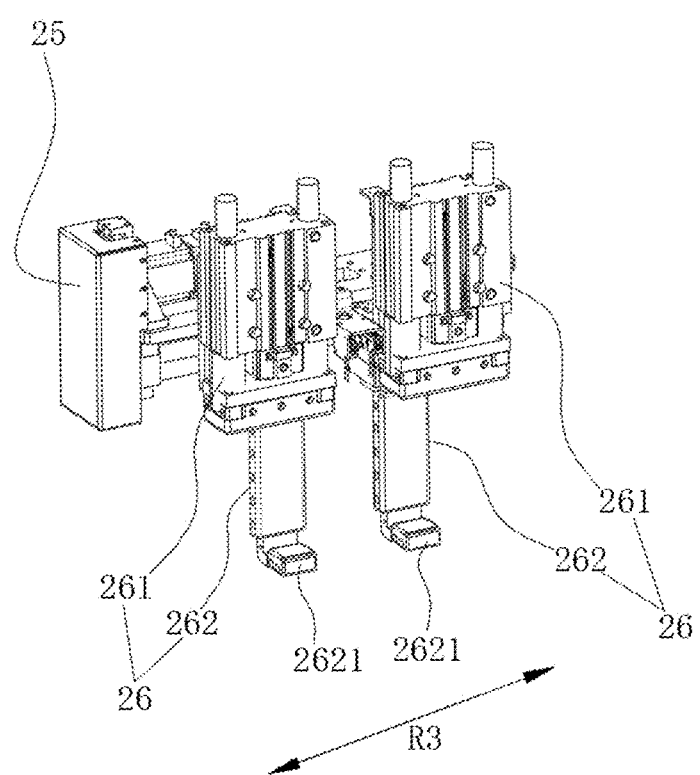
FIG. 13 is a schematic structural diagram of a clamping mechanism according to an embodiment of this disclosure, where a screw rod is not shown in the figure.

In an embodiment, referring to FIGS. 13 and 14, the clamping mechanism includes a regulation assembly 25 and clamping assemblies 26. The regulation assembly 25 is disposed on the support assembly 1. The clamping assemblies 26 are disposed on the regulation assembly 25, a quantity of the clamping assemblies 26 is two, each clamping assembly 26 is provided with the clamping opening 23, the opening directions of the corresponding clamping openings 23 of the two clamping assemblies 26 are consistent, an arrangement direction of the two clamping assemblies 26 is a third direction, the third direction intersects the opening directions of the corresponding clamping openings 23, and the regulation assembly 25 drives the two clamping assemblies 26 to move towards or away from each other along the third direction.

In the embodiments of this disclosure, referring to FIGS. 13 and 14, the third direction is a direction indicated by arrow R3 in the figure.

The arrangement direction of the two clamping assemblies 26 is the third direction, and the third direction intersects the opening direction of the corresponding clamping opening 23. When the two clamping assemblies 26 of the clamping mechanism clamp the grouped battery cells at the corresponding clamping openings 23, the two grouped battery cells are arranged along the third direction, and each clamping assembly 26 clamps one of the two grouped battery cells, that is, each clamping mechanism clamps one group of two grouped battery cells.

Exemplarily, among the grouped battery cells, the sizes and specifications of different groups of battery cells may be different. When the clamping mechanism clamps the battery cells, the sizes of the different groups of battery cells along the third direction may be different.

Exemplarily, the size of single-row grouped battery cells along the third direction is different from the size of double-row grouped battery cells along the third direction.

It should be noted that there is no bonding between two single-row grouped battery cells, and two double-row grouped battery cells are bonded to each other.

In the embodiments of this disclosure, each clamping mechanism is provided with two clamping assemblies 26, each clamping assembly 26 respectively grabs one of the two grouped battery cells, and both the single-row grouped battery cells and the double-row grouped battery cells can be clamped by the clamping mechanism. The third direction intersects the opening direction of the corresponding clamping opening 23, the two clamping assemblies 26 are driven to move towards or away from each other along the third direction using the regulation assembly 25, and the spacing between the two clamping assemblies 26 along the third direction is adjusted, so as to be applicable to grabbing two grouped battery cells with different sizes along the third direction.

In an embodiment, referring to FIG. 14, the regulation assembly 25 includes a main seat 251, a second driving module 252, a screw rod 253 and regulation seats 254. The main seat 251 is disposed on the support assembly 1. The second driving module 252 is installed on the main seat 251. The screw rod 253 is rotatably connected to the main seat 251, the screw rod 253 is located at one side of the main seat 251 facing away from the support assembly 1, the screw rod 253 is provided with a first thread 2531 and a second thread 2532, the first thread 2531 and the second thread 2532 are arranged along an axial direction of the screw rod 253, the axial direction of the screw rod 253 is arranged along the third direction, and a rotation direction of the first thread 2531 is opposite to a rotation direction of the second thread 2532. The clamping assemblies 26 are disposed on the regulation seats 254, each clamping assembly 26 is correspondingly provided with the regulation seat 254, one of the regulation seats 254 is in threaded connection to the first thread 2531, the other regulation seat 254 is in threaded connection to the second thread 2532, and the second driving module 252 drives the screw rod 253 to rotate, such that the two regulation seats 254 drive the clamping assemblies 26 to move towards or away from each other.

The main seat 251 is a main structure of the regulation assembly 25, and the main seat 251 provides support for other structures of the regulation assembly 25.

The second driving module 252 is configured to provide power for the screw rod 253.

In the embodiments of this disclosure, since the axial direction of the screw rod 253 is arranged along the third direction, when the second driving module 252 drives the screw rod 253 to rotate, movement directions of the two regulation seats 254 which are respectively in threaded connection to the first thread 2531 and the second thread 2532 with opposite rotation directions are opposite, and the two regulation seats 254 with opposite movement directions move towards or away from each other, such that the clamping assemblies 26 disposed on the corresponding regulation seats 254 move towards or away from each other, thereby adjusting the spacing between the two clamping assemblies 26 along the third direction. The screw rod 253 is located at one side of the main seat 251 facing away from the support assembly 1. Making full use of the opposite sides of the main seat 251 to arrange the screw rod 253 and the support assembly 1 respectively is conducive to reducing the interference between the screw rod 253 and the support assembly 1.

In an embodiment, referring to FIGS. 11 and 13, each clamping assembly 26 includes a telescopic piece 261 and a clamping jaw 262. The telescopic piece 261 is disposed on the regulation assembly 25. The clamping jaw 262 is disposed on the regulation assembly 25, the clamping jaw 262 is provided with a clamping portion 2621, the clamping portion 2621 is located at one side of the regulation assembly 25 facing away from the support assembly 1, the telescopic piece 261 is located at one side of the clamping portion 2621 facing towards the corresponding regulation assembly 25, and the clamping portion 2621 and the telescopic piece 261 together form a perimeter that defines the clamping opening 23.

The clamping portion 2621 and the telescopic piece 261 together form a perimeter that defines the clamping opening 23, and the battery cells are clamped between the clamping portion 2621 and the telescopic piece 261 through expansion and contraction of the telescopic piece 261.

In the embodiments of this disclosure, since the clamping portion 2621 is located at one side of the regulation assembly 25 that deviating from the support assembly 1, the telescopic piece 261 is located at one side of the clamping portion 2621 facing towards the support assembly 1, and the telescopic piece 261 can be as close to the regulation assembly 25 as possible relative to the clamping opening 23 under the condition that the clamping opening 23 is as far away from the support assembly 1 as possible, thereby alleviating the degree that the telescopic piece 261 hangs out of the regulation assembly 25.

Exemplarily, since each of the two conveying apparatuses is configured to receive the battery cells clamped by the clamping apparatus 200 driven by the transfer apparatus at one side facing towards the other conveying apparatus along the fourth direction, the conveying apparatus for placing the battery cells is far away from the corresponding transfer apparatus, and the clamping opening 23 is far away from the support assembly 1 as much as possible, which is conducive to placing the battery cells clamped at the clamping opening 23 to the corresponding farther conveying apparatus.

Figure 15:
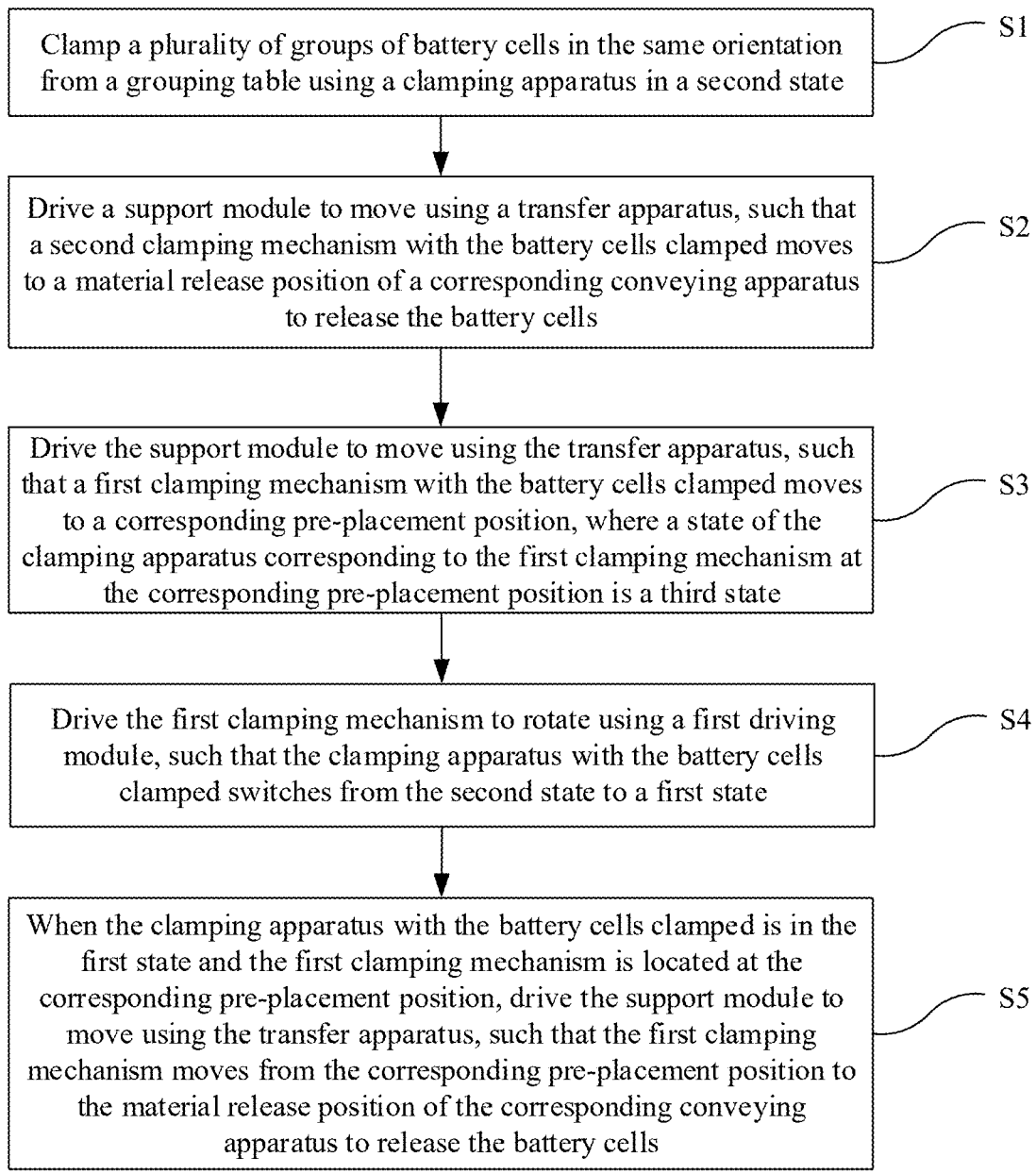
FIG. 15 is a flow chart of a transfer method according to an embodiment of this disclosure, where main steps of the transfer method are shown in the figure.

An embodiment of this disclosure provides a transfer method. Referring to FIG. 15, a clamping apparatus 200 has a first state and a second state, when the clamping apparatus 200 is in the first state, an opening direction of a clamping opening 23 of a first clamping mechanism 21 faces away from a second clamping mechanism 22 along a first direction, and when the clamping apparatus 200 is in the second state, the opening direction of the clamping opening 23 of the first clamping mechanism 21 faces towards the second clamping mechanism 22 along the first direction, such that the opening direction of the clamping opening 23 of the first clamping mechanism 21 is consistent with an opening direction of a clamping opening 23 of the second clamping mechanism 22. The transfer method includes:

Step S1: Clamp a plurality of groups of battery cells in the same orientation from a grouping table using the clamping apparatus in the second state.

Step S2: Drive a support module to move using a transfer apparatus, such that the second clamping mechanism with the battery cells clamped moves to a material release position of a corresponding conveying apparatus to release the battery cells.

Step S3: Drive the support module to move using the transfer apparatus, such that the first clamping mechanism with the battery cells clamped moves to a corresponding pre-placement position, where a state of the clamping apparatus corresponding to the first clamping mechanism at the corresponding pre-placement position is a third state.

Step S4: Drive the first clamping mechanism to rotate using a first driving module, such that the clamping apparatus with the battery cells clamped switches from the second state to the first state.

Step S5: When the clamping apparatus with the battery cells clamped is in the first state and the first clamping mechanism is located at the corresponding pre-placement position, drive the support module to move using the transfer apparatus, such that the first clamping mechanism moves from the corresponding pre-placement position to the material release position of the corresponding conveying apparatus to release the battery cells.

Exemplarily, in the second state, the first driving module 12 drives the first clamping mechanism 21 to rotate by 180 degrees to switch from the second state to the first state.

The clamping apparatus 200 in the second state clamps the plurality of groups of battery cells from the grouping table in the same orientation, and the same orientation refers to that the opening directions of the clamping openings 23 are consistent, and the clamping apparatus 200 moves along one direction to grab the plurality of groups of battery cells on the grouping table.

Among the plurality of groups of battery cells clamped by the clamping apparatus 200 from the grouping table, the order in which the battery cells clamped by the first clamping mechanism 21 and the battery cells clamped by the second clamping mechanism 22 are released is not limited.

Exemplarily, the battery cells clamped by the first clamping mechanism 21 may be released first, and then the battery cells clamped by the second clamping mechanism 22 may be released.

Exemplarily, the battery cells clamped by the second clamping mechanism 22 may be released first, and then the battery cells clamped by the first clamping mechanism 21 may be released.

Exemplarily, referring to FIG. 7, the first clamping mechanism 21 shown in the figure is located at the corresponding pre-placement position, and the first state and the third state of the clamping apparatus 200 coexist.

Exemplarily, referring to FIGS. 1 to 9, the material release position of the conveying apparatus that is configured to receive the battery cells clamped by the second clamping mechanism 22 is a first material release position 304, that is, the second clamping mechanism 22 releases the clamped battery cells at the first material release position 304.

Exemplarily, referring to FIGS. 1 to 9, the material release position of the conveying apparatus that is configured to receive the battery cells clamped by the first clamping mechanism 21 is a second material release position 303, that is, the first clamping mechanism 21 releases the clamped battery cells at the second material release position 303.

In the embodiments of this disclosure, when the clamping apparatus 200 is in the second state, the clamping openings 23 in the same orientation are configured to clamp the plurality of groups of battery cells from the grouping table. The first clamping mechanism 21 is driven to rotate using the first driving module 12, and the clamping apparatus 200 with the battery cells clamped switches from the second state to the first state, such that the opening direction of the clamping opening 23 of the first clamping mechanism 21 is not shielded by the second clamping mechanism 22, which is convenient for the first clamping mechanism 21 to release the battery cells onto the conveying apparatus. When the clamping apparatus 200 is in the first state and the first clamping mechanism 21 is located at the corresponding pre-placement position, the preparation action before the first clamping mechanism 21 releases the battery cells is basically completed. When the first clamping mechanism 21 moves to the material release position of the corresponding conveying apparatus, the battery cells clamped by the first clamping mechanism 21 can be released to the corresponding material release position smoothly, and transfer of the battery cells clamped by the first clamping mechanism 21 to the conveying apparatus is achieved. The second clamping mechanism 22 is not shielded whether the clamping apparatus 200 is in the first state or the second state, and the battery cells clamped by the second clamping mechanism 22 can be released to the material release position of the corresponding conveying apparatus smoothly. Therefore, the clamping apparatus 200 of the embodiments of this disclosure can not only meet the requirement of jointly grabbing the plurality of groups of grouped battery cells on the grouping table in the same orientation at one time, but also smoothly release the plurality of groups of grabbed grouped battery cells onto the material release position of the corresponding conveying apparatus, thereby better achieving the transfer of the plurality of groups of battery cells.

Figure 16:
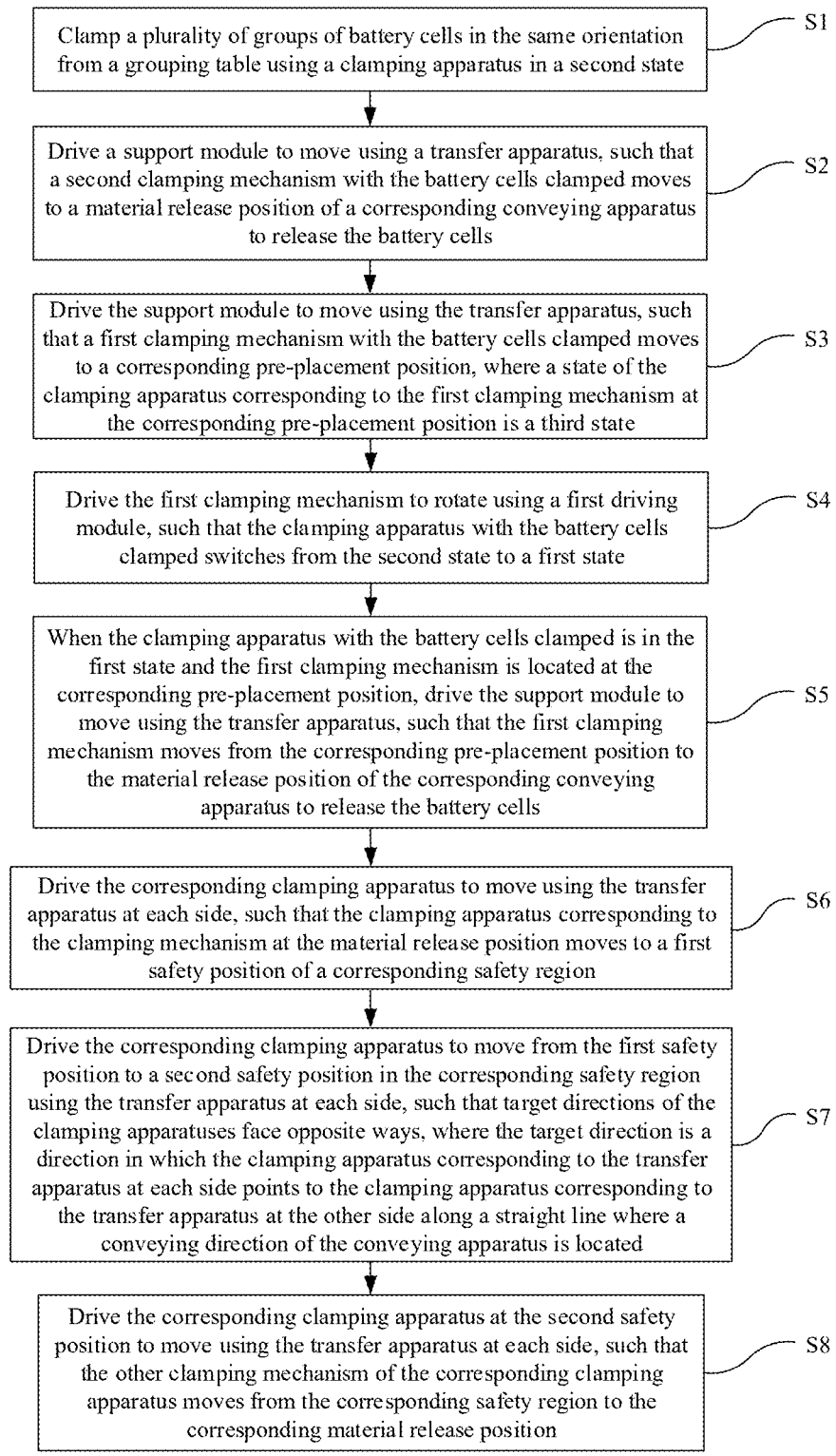
FIG. 16 is a flow chart of a transfer method according to an embodiment of this disclosure, where a step in which two clamping apparatuses draw back to safety regions is shown in the figure.

In an embodiment, referring to FIG. 16, the transfer method further includes:

Step S6: Drive the corresponding clamping apparatus to move using the transfer apparatus at each side, such that the clamping apparatus corresponding to the clamping mechanism at the material release position moves to a first safety position of a corresponding safety region.

Step S7: Drive the corresponding clamping apparatus to move from the first safety position to a second safety position in the corresponding safety region using the transfer apparatus at each side, such that target directions of the clamping apparatuses face opposite ways, where the target direction is a direction in which the clamping apparatus corresponding to the transfer apparatus at each side points to the clamping apparatus corresponding to the transfer apparatus at the other side along a straight line where a conveying direction of the conveying apparatus is located.

Step S8: Drive the corresponding clamping apparatus at the second safety position to move using the transfer apparatus at each side, such that the other clamping mechanism of the corresponding clamping apparatus moves from the corresponding safety region to the corresponding material release position.

Exemplarily, referring to FIGS. 1 to 5, regions outlined by dashed lines in the figure are the safety regions 400, and the quantity of the safety regions 400 shown in the figure is two.

The clamping apparatus 200 corresponding to the clamping mechanism at the material release position moves to the first safety position of the corresponding safety region 400. Since the safety region 400 where the clamping apparatus 200 is located is close to the corresponding transfer apparatus, the clamping apparatus 200 corresponding to the clamping mechanism at the material release position draws back to the first safety position of the safety region 400.

Figure 2:
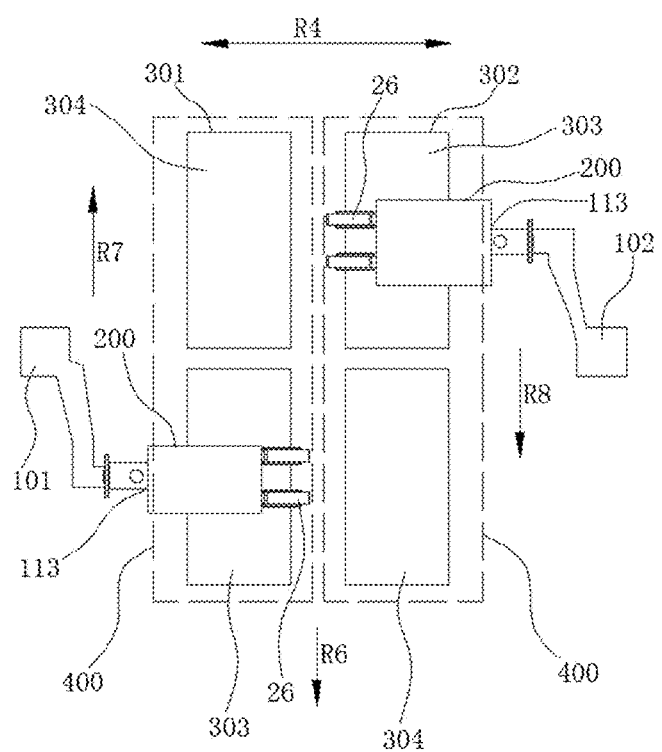
FIG. 2 is a state diagram in which transfer apparatuses drive corresponding clamping apparatuses to transfer battery cells to corresponding conveying apparatuses according to an embodiment of this disclosure, where the state shown in the figure is as follows: a clamping apparatus corresponding to a first transfer apparatus draws back to a first safety position of a corresponding safety region from a first material release position of a second conveying apparatus, and a clamping apparatus corresponding to a second transfer apparatus draws back to a first safety position of a corresponding safety region from a first material release position of a first conveying apparatus.

Exemplarily, referring to FIG. 2, the two clamping apparatuses 200 are respectively located at the first safety positions of the corresponding safety regions 400.

Exemplarily, referring to FIGS. 1 and 2, the safety region 400 corresponding to the clamping apparatus 200 driven by the first transfer apparatus 101 is close to the first conveying apparatus 301. When the clamping apparatus 200 driven by the first transfer apparatus 101 releases the clamped battery cells onto the second conveying apparatus 302, the first transfer apparatus 101 drives the corresponding clamping apparatus 200 to move up, and then draw back to the first safety position of the corresponding safety region 400 toward the first conveying apparatus 301 along the fourth direction.

Exemplarily, referring to FIGS. 1 and 2, the safety region 400 corresponding to the clamping apparatus 200 driven by the second transfer apparatus 102 is close to the second conveying apparatus 302. When the clamping apparatus 200 driven by the second transfer apparatus 102 releases the clamped battery cells onto the first conveying apparatus 301, the second transfer apparatus 102 drives the corresponding clamping apparatus 200 to move up, and then draw back to the first safety position of the corresponding safety region 400 toward the second conveying apparatus 302 along the fourth direction.

Figure 3:
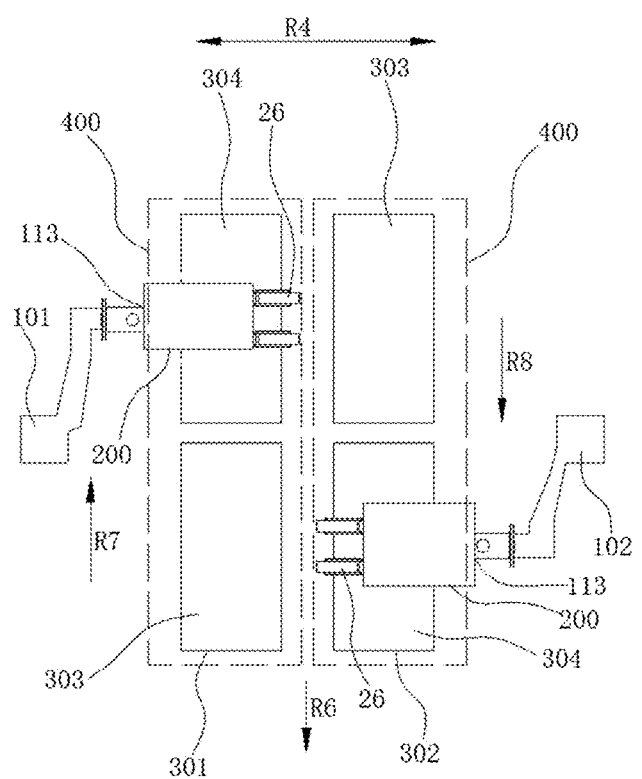
FIG. 3 is a state diagram in which transfer apparatuses drive corresponding clamping apparatuses to transfer battery cells to corresponding conveying apparatuses according to an embodiment of this disclosure, where the state shown in the figure is as follows: a clamping apparatus corresponding to a first transfer apparatus moves to a second safety position from a first safety position of a corresponding safety region, and a clamping apparatus corresponding to a second transfer apparatus moves to a second safety position from a first safety position of a corresponding safety region.
Figure 4:
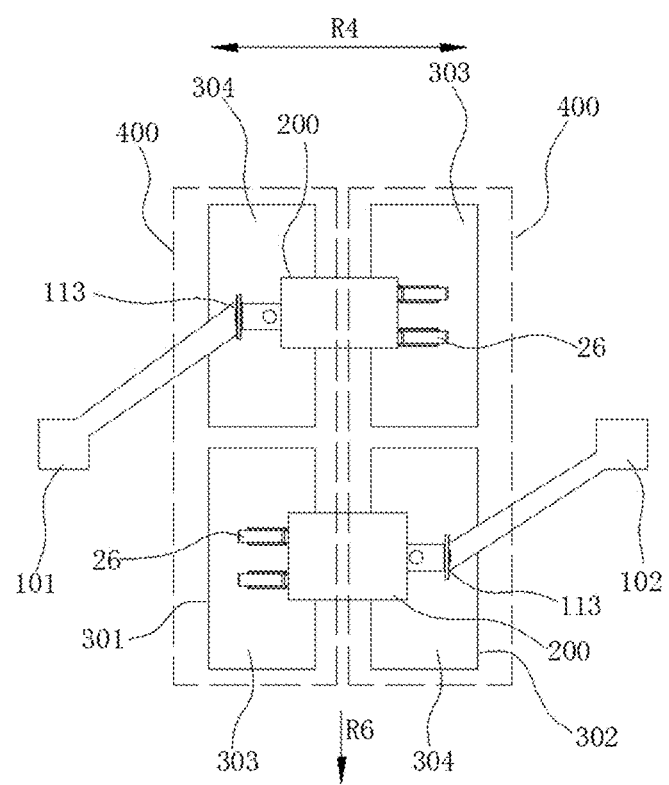
FIG. 4 is a state diagram in which transfer apparatuses drive corresponding clamping apparatuses to transfer battery cells to corresponding conveying apparatuses according to an embodiment of this disclosure, where the state shown in the figure is as follows: a clamping apparatus corresponding to a first transfer apparatus moves to a corresponding position from a second safety position, such that a corresponding first clamping mechanism is located at a corresponding pre-placement position, the pre-placement position corresponding to the first clamping mechanism corresponding to the first transfer apparatus is located above a second material release position of a second conveying apparatus, a clamping apparatus corresponding to a second transfer apparatus moves to a corresponding position from a second safety position, such that a corresponding first clamping mechanism is located at a corresponding pre-placement position, and a pre-placement position corresponding to a second clamping mechanism corresponding to the second transfer apparatus is located above a second material release position of a first conveying apparatus.
Figure 5:
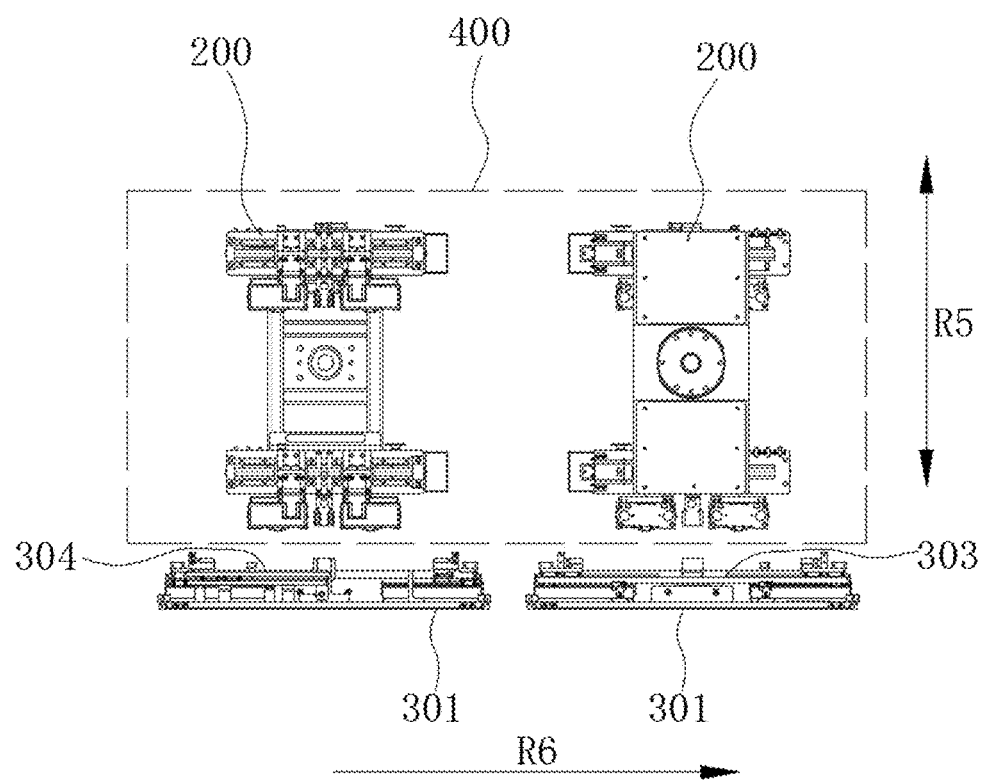
FIG. 5 is a diagram in direction A in FIG. 1, in which a transfer apparatus is omitted.

Exemplarily, referring to FIG. 3, the two clamping apparatuses 200 are respectively located at the second safety positions of the corresponding safety regions 400.

Exemplarily, referring to FIGS. 2 and 3, the safety region 400 corresponding to the clamping apparatus 200 driven by the first transfer apparatus 101 is close to the first conveying apparatus 301, and a direction in which the first safety position of the corresponding safety region 400 points to the second safety position is opposite to the conveying direction of the conveying apparatus.

Exemplarily, referring to FIGS. 2 and 3, the direction in which the first safety position of the safety region 400 corresponding to the clamping apparatus 200 driven by the first transfer apparatus 101 points to the second safety position is a direction indicated by arrow R7 in the figure. Exemplarily, referring to FIGS. 2 and 3, the safety region 400 corresponding to the clamping apparatus 200 driven by the second transfer apparatus 102 is close to the second conveying apparatus 302, and a direction in which the first safety position of the corresponding safety region 400 points to the second safety position is disposed along the conveying direction of the conveying apparatus.

Exemplarily, referring to FIGS. 2 and 3, the direction in which the first safety position of the safety region 400 corresponding to the clamping apparatus 200 driven by the second transfer apparatus 102 points to the second safety position is a direction indicated by arrow R8 in the figure.

Exemplarily, referring to FIG. 2, the clamping apparatuses 200 are at the first safety positions, and the direction in which the clamping apparatus 200 corresponding to the first transfer apparatus 101 points to the clamping apparatus 200 corresponding to the second transfer apparatus 102 along the straight line where the conveying direction of the conveying apparatus is located is the direction indicated by arrow R7 in the figure. Referring to FIG. 3, the clamping apparatuses 200 move to the second safety positions, and the direction in which the clamping apparatus 200 corresponding to the first transfer apparatus 101 points to the clamping apparatus 200 corresponding to the second transfer apparatus 102 along the straight line where the conveying direction of the conveying apparatus is located is the direction indicated by arrow R8 in the figure. The direction indicated by arrow R7 is opposite to that indicated by arrow R8.

In the embodiments of this disclosure, after the clamping apparatus 200 driven by the transfer apparatus at each side releases the clamped battery cells onto the corresponding conveying apparatus, the clamping apparatus 200 draws back to the corresponding safety region 400. Since the two safety regions 400 are spaced apart along the fourth direction, the transfer apparatus at each side is located at one side of the corresponding safety region 400 facing away from the other safety region 400 along the fourth direction, and the two clamping apparatuses 200 located in the safety regions 400 respectively are spaced apart along the fourth direction, the two clamping apparatuses 200 moving in the corresponding safety regions 400 basically do not interfere with each other. The two clamping apparatuses 200 move in the corresponding safety regions 400 respectively along opposite directions, which is conducive to reducing the possibility of interference between the two clamping apparatuses 200 in the process of changing the material release position of one clamping mechanism of each clamping apparatus 200 to the material release position corresponding to the other clamping mechanism.

Figure 17:
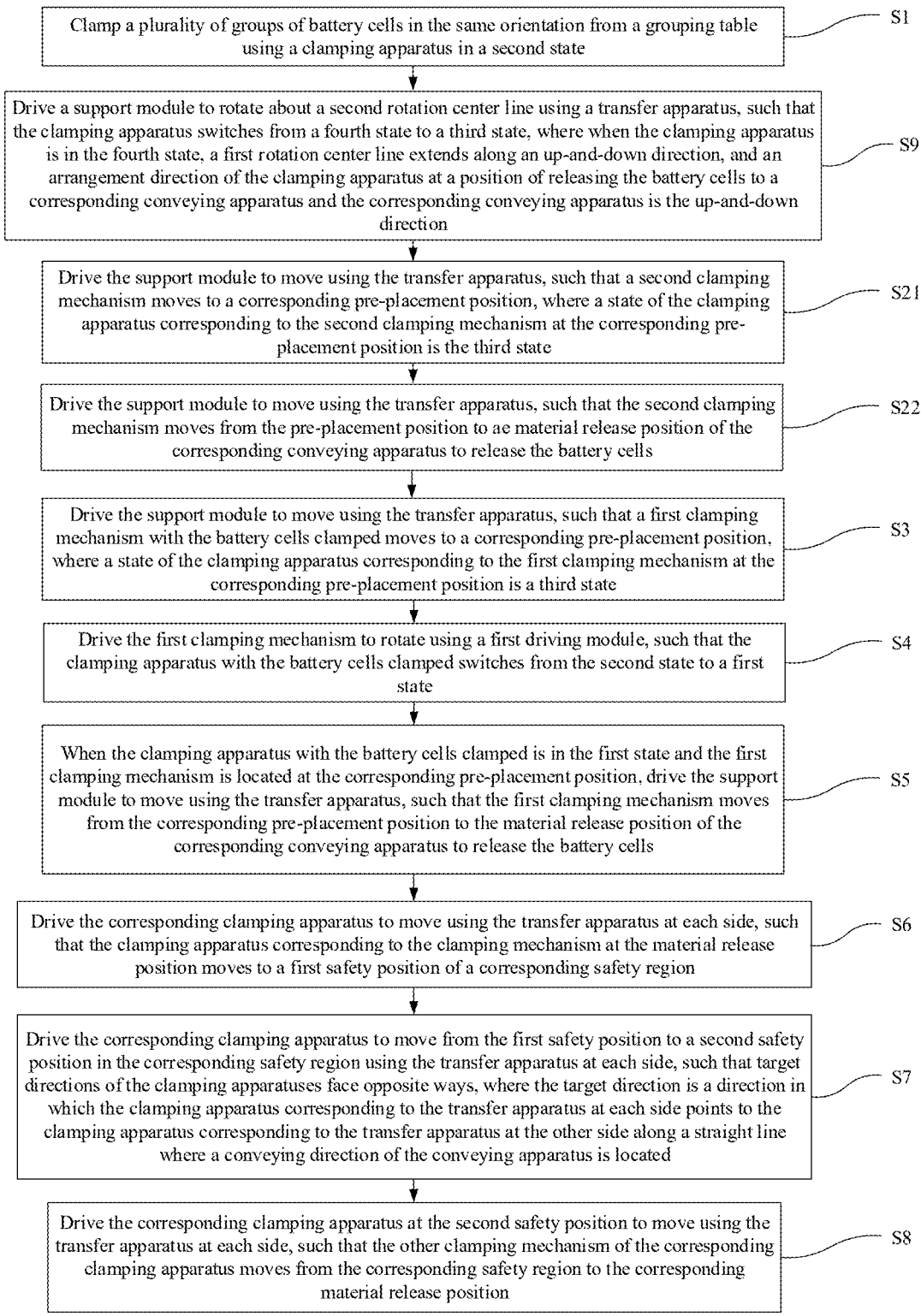
FIG. 17 is a flow chart of a transfer method according to an embodiment of this disclosure, where a step in which a clamping apparatus switches between a third state and a fourth state and specific steps in which a second clamping mechanism releases battery cells onto a conveying mechanism are shown in the figure.

In an embodiment, referring to FIG. 17, the driving the support module 11 to move using the transfer apparatus, such that the second clamping mechanism 22 with the battery cells clamped moves to the material release position of the corresponding conveying apparatus to release the battery cells includes:

Step S21: Drive the support module to move using the transfer apparatus, such that the second clamping mechanism moves to a corresponding pre-placement position, where a state of the clamping apparatus corresponding to the second clamping mechanism at the corresponding pre-placement position is a third state.

Step S22: Drive the support module to move using the transfer apparatus, such that the second clamping mechanism moves from the pre-placement position to the material release position of the corresponding conveying apparatus to release the battery cells.

Exemplarily, referring to FIG. 6, the second clamping mechanism 22 shown in the figure is located at the corresponding pre-placement position, and the second state and the third state of the clamping apparatus 200 coexist.

In the embodiments of this disclosure, the second clamping mechanism completes various preparation actions in the process of moving to the pre-placement position, and then moves from the pre-placement position to the material release position, thereby reducing the possibility that the second clamping mechanism interferes with other structures during movement.

In an embodiment, referring to FIG. 17, the transfer method further includes:

Step S9: Drive the support module to rotate about a second rotation center line using the transfer apparatus, such that the clamping apparatus switches from a fourth state to the third state, where when the clamping apparatus is in the fourth state, a first rotation center line extends along an up-and-down direction, and an arrangement direction of the clamping apparatus at a position to release the battery cells onto the corresponding conveying apparatus and the corresponding conveying apparatus is the up-and-down direction.

In the embodiments of this disclosure, since the orientation of tape sticking surfaces of the battery cells on the grouping table is different from the orientation of tape sticking surfaces of the battery cells on the conveying apparatus, the battery cells on the grouping table are clamped by the clamping apparatus 200 in the fourth state, the support module 11 is driven to rotate about the second rotation center line 202 using the transfer apparatus, and the clamping apparatus 200 with the battery cells clamped switches from the fourth state to the third state, such that the clamping apparatus 200 can release the battery cells onto the conveying apparatus smoothly.

Figure 18:
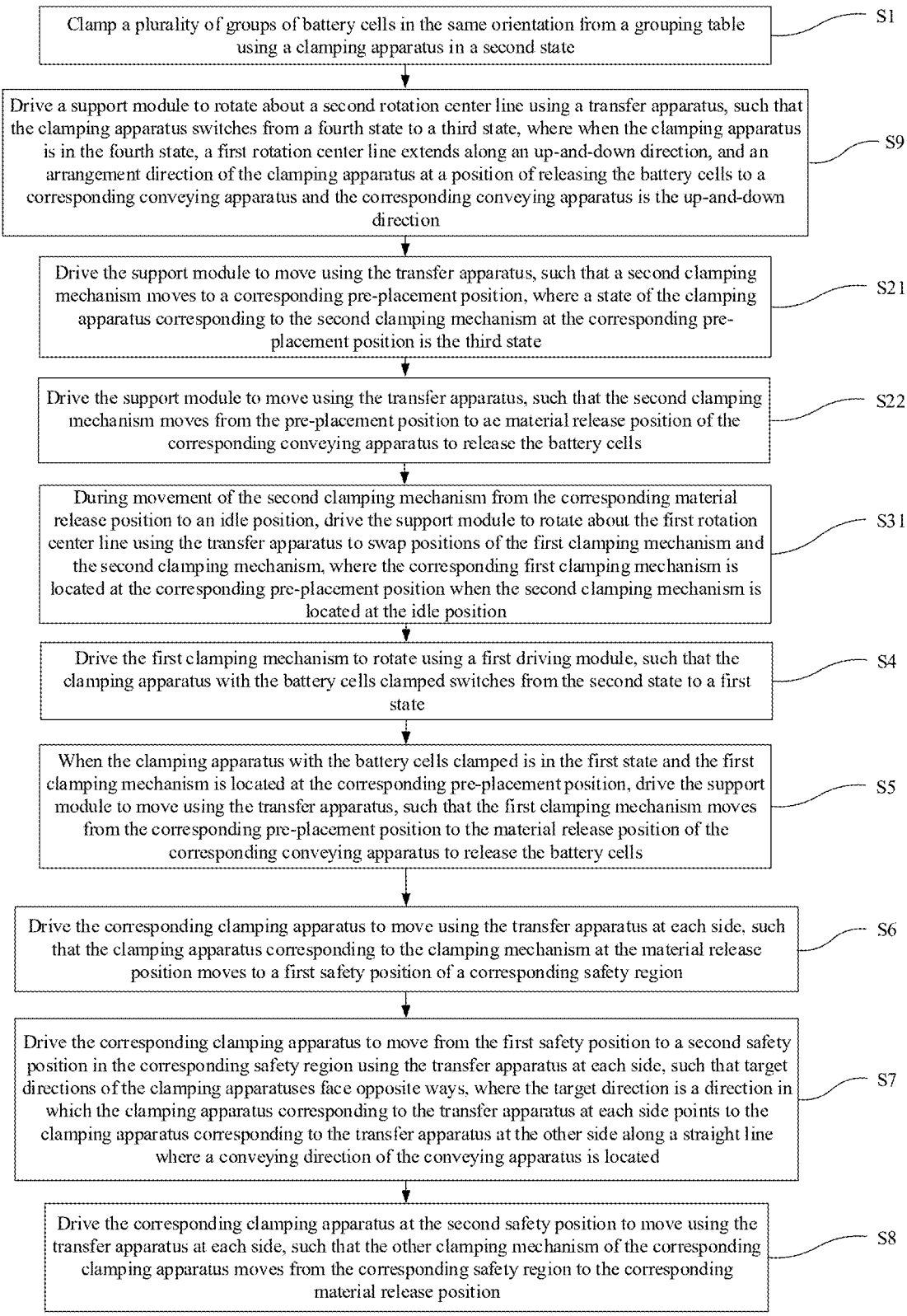
FIG. 18 is a flow chart of a transfer method according to an embodiment of this disclosure, where a step for swapping positions of a first clamping mechanism and a second clamping mechanism is shown in the figure.

Exemplarily, referring to FIG. 18, the driving the support module 11 to move using the transfer apparatus, such that the first clamping mechanism 21 with the battery cells clamped moves to the corresponding pre-placement position, where the state of the clamping apparatus 200 corresponding to the first clamping mechanism 21 at the corresponding pre-placement position is the third state includes:

Step S31: During movement of the second clamping mechanism from the corresponding material release position to an idle position, drive the support module to rotate about the first rotation center line using the transfer apparatus so as to swap positions of the first clamping mechanism and the second clamping mechanism, where the corresponding first clamping mechanism is located at the corresponding pre-placement position when the second clamping mechanism is located at the idle position.

Exemplarily, referring to FIG. 7, the second clamping mechanism 22 shown in the figure is located at the idle position, and the first clamping mechanism is located at the corresponding pre-placement position.

That the support module 11 is driven to rotate about the first rotation center line 201 using the transfer apparatus to drive to swap positions of the first clamping mechanism 21 and the second clamping mechanism 22 means position swap with respect to the first rotation center line 201. Specifically, the support module 11 rotates by 180 degrees about the first rotation center line 201.

In the embodiments of this disclosure, the first clamping mechanism 21 is at the pre-placement position by swapping the positions of the first clamping mechanism 21 and the second clamping mechanism 22, and the second clamping mechanism 22 at the idle position is far away from the corresponding conveying apparatus, which is convenient for the first clamping mechanism 21 to release the battery cells.

Figure 19:
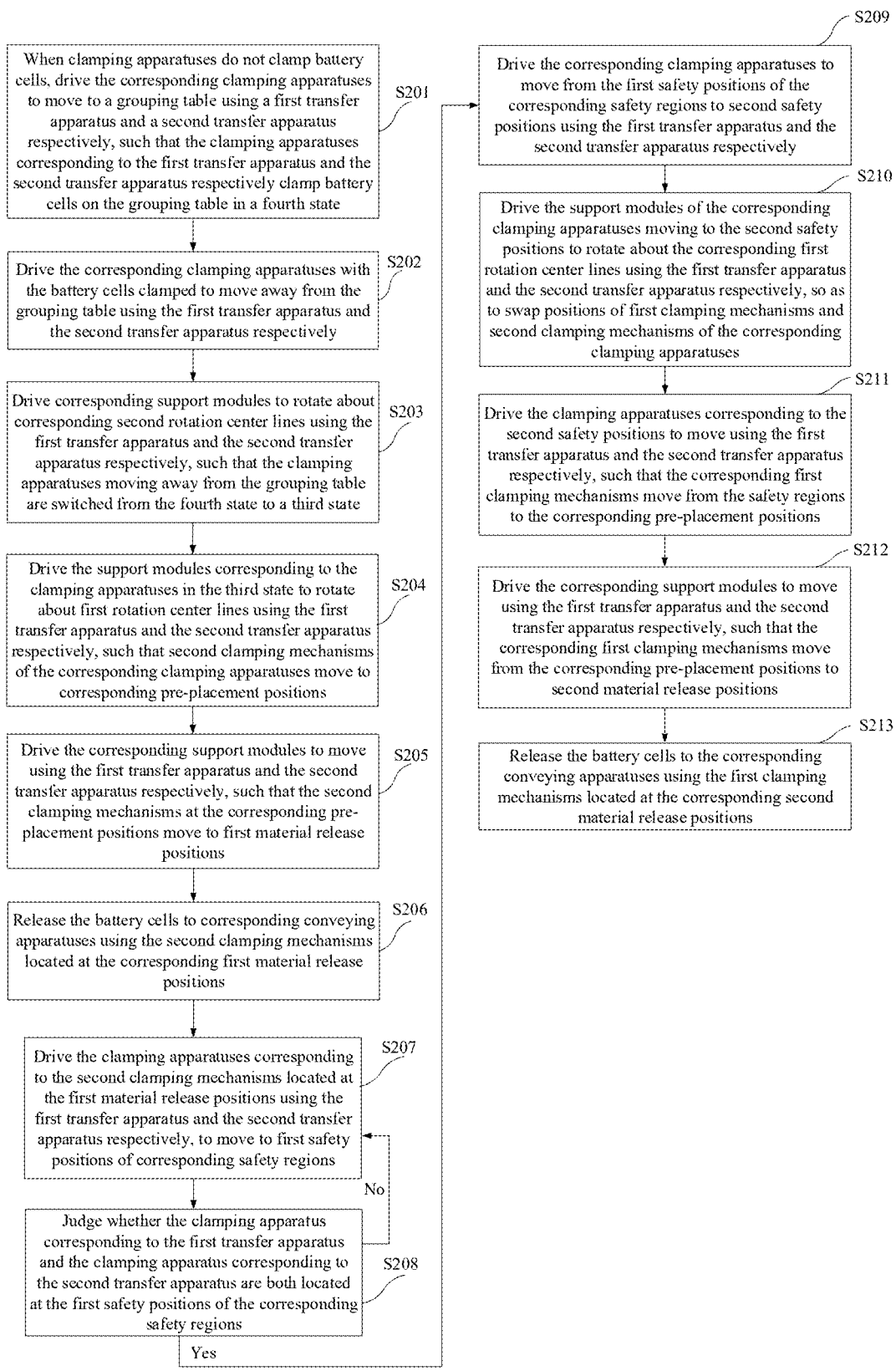
FIG. 19 is a flow chart of a transfer method according to an embodiment of this disclosure, where specific steps in which two transfer apparatuses drive corresponding clamping apparatuses to transfer battery cells on a grouping table to corresponding conveying apparatuses are shown in the figure.

Referring to FIG. 19, specific steps of the transfer method according to one embodiment of this disclosure are as follows.

Step S201: When the clamping apparatuses do not clamp the battery cells, drive the corresponding clamping apparatuses to move to the grouping table using the first transfer apparatus and the second transfer apparatus respectively, such that the clamping apparatuses corresponding to the first transfer apparatus and the second transfer apparatus respectively clamp the battery cells on the grouping table in the fourth state.

Step S202: Drive the corresponding clamping apparatuses with the battery cells clamped to move away from the grouping table using the first transfer apparatus and the second transfer apparatus respectively.

Step S203: Drive the corresponding support modules to rotate about the corresponding second rotation center lines using the first transfer apparatus and the second transfer apparatus respectively, such that the clamping apparatuses moving away from the grouping table are switched from the fourth state to the third state.

Step S204: Drive the support modules corresponding to the clamping apparatuses in the third state to rotate about the first rotation center lines using the first transfer apparatus and the second transfer apparatus respectively, such that the second clamping mechanisms of the corresponding clamping apparatuses move to the corresponding pre-placement positions.

Step S205: Drive the corresponding support modules to move using the first transfer apparatus and the second transfer apparatus respectively, such that the second clamping mechanisms at the corresponding pre-placement positions move to the first material release positions.

Step S206: Release the battery cells onto the corresponding conveying apparatuses using the second clamping mechanisms located at the corresponding first material release positions.

Step S207: Drive the clamping apparatuses corresponding to the second clamping mechanisms located at the first material release positions to move to the first safety positions of the corresponding safety regions using the first transfer apparatus and the second transfer apparatus respectively.

Step S208: Judge whether the clamping apparatus corresponding to the first transfer apparatus and the clamping apparatus corresponding to the second transfer apparatus are both located at the first safety positions of the corresponding safety regions.

If yes, step S209 is executed; and if no, step S207 is executed.

Step S209: Drive the corresponding clamping apparatuses to move from the first safety positions of the corresponding safety regions to the second safety positions using the first transfer apparatus and the second transfer apparatus respectively.

Step S210: Drive the support modules of the corresponding clamping apparatuses moving to the second safety positions to rotate about the corresponding first rotation center lines using the first transfer apparatus and the second transfer apparatus respectively, so as to swap the positions of the first clamping mechanisms and the second clamping mechanisms of the corresponding clamping apparatuses.

Step S211: Drive the clamping apparatuses corresponding to the second safety positions to move using the first transfer apparatus and the second transfer apparatus respectively, such that the corresponding first clamping mechanisms move from the safety regions to the corresponding pre-placement positions.

Step S212: Drive the corresponding support modules to move using the first transfer apparatus and the second transfer apparatus respectively, such that the corresponding first clamping mechanisms move from the corresponding pre-placement positions to the second material release positions.

Step S213: Release the battery cells onto the corresponding conveying apparatuses using the first clamping mechanisms located at the corresponding second material release positions.

The foregoing embodiments are merely intended to describe the technical solutions of this disclosure but not to limit this disclosure. Although this disclosure has been described in detail with reference to the foregoing embodiments, those of ordinary skill in the art understand that modifications may still be made to the technical solutions described in the foregoing embodiments, or equivalent replacements may still be made to some or all technical features in the technical solutions. Such modifications and replacements do not make the essence of the corresponding technical solutions depart from the scope of the technical solutions of the embodiments of this disclosure, but still fall within the scope of this disclosure. In particular, the various technical features mentioned in the various embodiments may be combined in any manner as long as there is no structural conflict.

INDUSTRIAL PRACTICALITY

The first driving module of the embodiments of this disclosure drives the first clamping mechanism to rotate, such that the clamping apparatus can switch between the first state and the second state. When the clamping apparatus grabs the battery cells from the grouping table, the clamping apparatus may be in the second state, and the opening direction of the clamping opening of the first clamping mechanism and the opening direction of the clamping opening of the second clamping mechanism can tend to be consistent, which is convenient for the clamping apparatus to jointly grab the plurality of groups of grouped battery cells in the same orientation at one time. When the clamping apparatus clamps the plurality of groups of grouped battery cells and places the plurality of groups of grouped battery cells on the conveying apparatus, the clamping opening of the second clamping mechanism corresponding to the clamping apparatus in the second state faces away from the first clamping mechanism, and the battery cells clamped at the clamping opening of the second clamping mechanism can be smoothly released to the conveying apparatus. When it is needed to release the battery cells clamped at the clamping opening of the first clamping mechanism to the conveying apparatus, the first clamping mechanism is driven to rotate using the first driving module, such that the clamping apparatus switches from the second state to the first state. The opening direction of the clamping opening of the first clamping mechanism corresponding to the clamping apparatus in the first state faces away from the second clamping mechanism, and the clamping opening of the first clamping mechanism is no longer shielded by the second clamping mechanism, such that the battery cells clamped by the first clamping mechanism can be smoothly released to the conveying apparatus. Therefore, the clamping apparatus of the embodiments of this disclosure can not only meet the requirement of jointly grabbing the plurality of groups of grouped battery cells on the grouping table in the same orientation at one time, but also smoothly release the plurality of groups of grabbed grouped battery cells onto the corresponding conveying apparatus, thereby better achieving the transfer of the plurality of groups of battery cells.

What is claimed is:

1. A clamping apparatus, having a first state and a second state, and comprising:

a support assembly, comprising a support module and a first driving module disposed on the support module; and clamping mechanisms, disposed on the support assembly, wherein at least one of the clamping mechanisms is a first clamping mechanism, and at least one of the clamping mechanisms is a second clamping mechanism; the first clamping mechanism and the second clamping mechanism are arranged along a first direction; when the clamping apparatus is in the first state, an opening direction of a clamping opening of the first clamping mechanism faces away from the second clamping mechanism along the first direction; when the clamping apparatus is in the second state, the opening direction of the clamping opening of the first clamping mechanism faces towards the second clamping mechanism along the first direction, such that the opening direction of the clamping opening of the first clamping mechanism is consistent with an opening direction of a clamping opening of the second clamping mechanism;

wherein the first driving module is configured to drive the first clamping mechanism to rotate, enabling the clamping apparatus to switch between the first state and the second state, and each clamping opening is configured to allow a battery cell to move in or out of the corresponding clamping mechanism along the first direction.

2. The clamping apparatus according to claim 1, wherein the first driving module comprises:

a driver, disposed on the support module; and a mounting seat, at least partially disposed on the driver, wherein the driver drives the mounting seat to rotate, and the first clamping mechanism is disposed on the mounting seat.

3. The clamping apparatus according to claim 2, wherein each clamping mechanism is provided with a mounting portion, the mounting seat is connected to the mounting portion of the corresponding clamping mechanism, the driver, the mounting seat and the mounting portion of the corresponding clamping mechanism are sequentially arranged along a second direction, and the second direction intersects the first direction.

4. The clamping apparatus according to claim 1, wherein the second clamping mechanism is partially connected to the support module, and the opening direction of the clamping opening of the second clamping mechanism faces away from the first clamping mechanism.

5. The clamping apparatus according to claim 4, wherein the support module comprises:

a rack body, wherein the first driving module is disposed on the rack body; and a mounting arm, connected to the rack body, wherein the second clamping mechanism is partially connected to the mounting arm.

6. The clamping apparatus according to claim 1, wherein each clamping mechanism comprises:

a regulation assembly, disposed on the support assembly; and clamping assemblies, disposed on the regulation assembly, wherein a quantity of the clamping assemblies is two, each of the clamping assemblies is provided with a clamping opening, the opening directions of the corresponding clamping openings of the two clamping assemblies are consistent, an arrangement direction of the two clamping assemblies is a third direction, the third direction intersects the opening directions of the corresponding clamping openings, and the regulation assembly drives the two clamping assemblies to move towards or away from each other along the third direction.

7. The clamping apparatus according to claim 6, wherein the regulation assembly comprises:

a main seat, disposed on the support assembly;

a second driving module, installed on the main seat;

a screw rod, rotatably connected to the main seat, wherein the screw rod is located at one side of the main seat facing away from the support assembly, the screw rod is provided with a first thread and a second thread, the first thread and the second thread are arranged along an axial direction of the screw rod, the axial direction of the screw rod is arranged along the third direction, and a rotation direction of the first thread is opposite to a rotation direction of the second thread; and regulation seats, wherein the clamping assemblies are disposed on the regulation seats, with a regulation seat corresponding to each clamping assembly, one of the regulation seats is in threaded connection to the first thread, the other regulation seat is in threaded connection to the second thread, and the second driving module drives the screw rod to rotate, causing the two regulation seats to move the clamping assemblies towards or away from each other.

8. The clamping apparatus according to claim 6, wherein each clamping assembly comprises:

a telescopic piece, disposed on the regulation assembly; and a clamping jaw, disposed on the regulation assembly, wherein the clamping jaw is provided with a clamping portion, the clamping portion is located at one side of the regulation assembly facing away from the support assembly, the telescopic piece is located at one side of the clamping portion facing towards the corresponding regulation assembly, and the clamping portion and the telescopic piece together form a perimeter that defines the clamping opening.

9. A battery production line, comprising:

a transfer apparatus;

the clamping apparatus according to claim 1, wherein the clamping apparatus has a third state, the support module is disposed on the transfer apparatus, and the transfer apparatus is able to drive the support module to rotate about a first rotation center line so as to swap positions of the first clamping mechanism and the second clamping mechanism;

a grouping table, configured to place grouped battery cells, wherein the transfer apparatus drives the clamping apparatus to grab the grouped battery cells from the grouping table; and a conveying apparatus, configured to receive and convey the battery cells clamped by the clamping apparatus, wherein when the clamping apparatus is at a position to release the battery cells onto the corresponding conveying apparatus, an arrangement direction of the clamping apparatus and the corresponding conveying apparatus is an up-and-down direction, and when the clamping apparatus is in the third state, the first rotation center line intersects the up-and-down direction.

10. The battery production line according to claim 9, wherein the clamping apparatus further has a fourth state, and when the clamping apparatus is in the fourth state, the first rotation center line extends in the up-and-down direction; and the transfer apparatus is able to drive the support module to rotate about a second rotation center line, enabling the clamping apparatus to switch between the third state and the fourth state, the second rotation center line intersecting the first rotation center line.

11. The battery production line according to claim 9, wherein:
the support module is provided with a connecting portion connected to the corresponding transfer apparatus, the connecting portion is located at one side of the corresponding support module facing away from the corresponding clamping mechanism along a preset direction, and the preset direction is a direction along the first rotation center line;
the conveying apparatus is provided in a quantity of two, an arrangement direction of the two conveying apparatuses is a fourth direction, the transfer apparatus is disposed at one side of each of the conveying apparatus facing away from the other conveying apparatus along the fourth direction, the transfer apparatus at each side is correspondingly provided with the clamping apparatus, and conveying directions of the two conveying apparatuses are consistent; and
in the two conveying apparatuses, one conveying apparatus is a first conveying apparatus, and the other conveying apparatus is a second conveying apparatus, wherein the transfer apparatus at one side of the first conveying apparatus facing away from the second conveying apparatus along the fourth direction is a first transfer apparatus, the first transfer apparatus drives the corresponding clamping apparatus to move so as to release the corresponding battery cells onto the second conveying apparatus, the transfer apparatus at one side of the second conveying apparatus facing away from the first conveying apparatus along the fourth direction is a second transfer apparatus, and the second transfer apparatus drives the corresponding clamping apparatus to move so as to release the corresponding battery cells onto the first conveying apparatus.

12. The battery production line according to claim 11, wherein the battery production line is provided with safety regions, the clamping apparatus driven by the transfer apparatus at each side is provided with a corresponding safety region, the safety regions corresponding to the clamping apparatuses driven by the transfer apparatuses at both sides are spaced apart along the fourth direction, the transfer apparatus at each side is located at one side of the corresponding safety region facing away from the safety region corresponding to the transfer apparatus at the other side along the fourth direction, and the transfer apparatus at each side is able to drive the corresponding clamping apparatus to move into the corresponding safety region.

13. A transfer method, applied to at least a clamping apparatus having a first state and a second state, wherein when the clamping apparatus is in the first state, an opening direction of a clamping opening of a first clamping mechanism faces away from a second clamping mechanism along a first direction, and when the clamping apparatus is in the second state, the opening direction of the clamping opening of the first clamping mechanism faces towards the second clamping mechanism along the first direction, such that the opening direction of the clamping opening of the first clamping mechanism is consistent with an opening direction of a clamping opening of the second clamping mechanism, the transfer method comprising:
clamping a plurality of groups of battery cells in the same orientation from a grouping table using the clamping apparatus in the second state;
driving a support module to move using a transfer apparatus, such that the second clamping mechanism with the battery cells clamped moves to a material release position of a corresponding conveying apparatus to release the battery cells;
driving the support module to move using the transfer apparatus, such that the first clamping mechanism with the battery cells clamped moves to a corresponding pre-placement position, wherein a state of the clamping apparatus corresponding to the first clamping mechanism at the corresponding pre-placement position is a third state;
driving the first clamping mechanism to rotate using a first driving module, such that the clamping apparatus with the battery cells clamped switches from the second state to the first state; and
when the clamping apparatus with the battery cells clamped is in the first state and the first clamping mechanism is located at the corresponding pre-placement position, driving the support module to move using the transfer apparatus, such that the first clamping mechanism moves from the corresponding pre-placement position to the material release position of the corresponding conveying apparatus to release the battery cells.

14. The transfer method according to claim 13, further comprising:
driving the corresponding clamping apparatus to move using the transfer apparatus at each side, such that the clamping apparatus corresponding to the clamping mechanism at the material release position moves to a first safety position of a corresponding safety region;
driving the corresponding clamping apparatus to move from the first safety position to a second safety position in the corresponding safety region using the transfer apparatus at each side, such that target directions of the clamping apparatuses face opposite ways, wherein the target direction is a direction in which the clamping apparatus corresponding to the transfer apparatus at each side points to the clamping apparatus corresponding to the transfer apparatus at the other side along a straight line wherein a conveying direction of the conveying apparatus is located; and
driving the corresponding clamping apparatus at the second safety position to move using the transfer apparatus at each side, such that the other clamping mechanism of the corresponding clamping apparatus moves from the corresponding safety region to the corresponding material release position.

15. The transfer method according to claim 13, wherein driving the support module to move using the transfer apparatus, such that the second clamping mechanism with the battery cells clamped moves to the material release position of the corresponding conveying apparatus to release the battery cells comprises:
driving the support module to move using the transfer apparatus, such that the second clamping mechanism moves to a corresponding pre-placement position, wherein a state of the clamping apparatus corresponding to the second clamping mechanism at the corresponding pre-placement position is a third state; and
driving the support module to move using the transfer apparatus, such that the second clamping mechanism moves from the pre-placement position to the material release position of the corresponding conveying apparatus to release the battery cells.

16. The transfer method according to claim 13, further comprising:

driving the support module to rotate about a second rotation center line using the transfer apparatus, such that the clamping apparatus switches from a fourth state to the third state, wherein when the clamping apparatus is in the fourth state, a first rotation center line extends along an up-and-down direction, and an arrangement direction of the clamping apparatus at a position to release the battery cells onto the corresponding conveying apparatus and the corresponding conveying apparatus is the up-and-down direction.

17. The transfer method according to claim 13, wherein driving the support module to move using the transfer apparatus, such that the first clamping mechanism with the battery cells clamped moves to the corresponding pre-placement position, wherein the state of the clamping apparatus corresponding to the first clamping mechanism at the corresponding pre-placement position is the third state comprises:

during movement of the second clamping mechanism from the corresponding material release position to an idle position, driving the support module to rotate about the first rotation center line using the transfer apparatus so as to swap positions of the first clamping mechanism and the second clamping mechanism, wherein the corresponding first clamping mechanism is located at the corresponding pre-placement position when the second clamping mechanism is located at the idle position.

* * * * *